(12) United States Patent
He et al.

(10) Patent No.: US 9,275,360 B2
(45) Date of Patent: Mar. 1, 2016

(54) ACCOUNT OPENING FLOW CONFIGURATION COMPUTER SYSTEM AND PROCESS FOR IMPLEMENTING SAME

(75) Inventors: Yilu He, Riverview, FL (US); John P. Flood, Bartlett, IL (US); Ron Lesandro, Hamburg, NY (US); Michael J. Sullivan, Colden, NY (US); Trevor Johnson, Vancouver (CA); Sonu Gupta, Tampa, FL (US)

(73) Assignee: HSBC Technology & Services (USA) Inc., Mettawa, IL (US)

( * ) Notice: Subject to any disclaimer, the term of this patent is extended or adjusted under 35 U.S.C. 154(b) by 450 days.

(21) Appl. No.: 13/354,915

(22) Filed: Jan. 20, 2012

(65) Prior Publication Data

US 2012/0179494 A1    Jul. 12, 2012

Related U.S. Application Data

(63) Continuation-in-part of application No. 13/270,831, filed on Oct. 11, 2011, now Pat. No. 8,843,939, and a continuation-in-part of application No. 13/276,956, filed on Oct. 19, 2011, now Pat. No. 8,589,213, and a (Continued)

(51) Int. Cl.
*G06Q 40/00*     (2012.01)
*G06Q 10/06*     (2012.01)
*G06Q 40/08*     (2012.01)

(52) U.S. Cl.
CPC ............ *G06Q 10/0637* (2013.01); *G06Q 40/08* (2013.01)

(58) Field of Classification Search
USPC ....... 705/35, 36 R, 37, 38; 707/736; 715/235, 715/253
See application file for complete search history.

(56) References Cited

U.S. PATENT DOCUMENTS

| | | | |
|---|---|---|---|
| 5,866,889 A | 2/1999 | Weiss | |
| 6,021,397 A * | 2/2000 | Jones et al. | ................. 705/36 R |
| 6,131,810 A | 10/2000 | Weiss | |
| 6,199,077 B1 | 3/2001 | Inala | |
| 6,278,993 B1 | 8/2001 | Kumar | |
| 6,292,789 B1 | 9/2001 | Schutzer | |
| 6,354,490 B1 | 3/2002 | Weiss | |
| 6,412,073 B1 | 6/2002 | Rangan | |
| 6,567,850 B1 | 5/2003 | Freishtat | |
| 6,594,766 B2 | 7/2003 | Rangan | |
| 6,633,910 B1 | 10/2003 | Rajan | |
| 6,725,425 B1 | 4/2004 | Rajan | |

(Continued)

OTHER PUBLICATIONS

International Search Report and Written Opinion from International application No. PCT/US11/58014, issued Feb. 27, 2012.

(Continued)

*Primary Examiner* — Lalita M Hamilton
(74) *Attorney, Agent, or Firm* — Stroock & Stroock & Lavan LLP

(57) ABSTRACT

An account opening computer system is configured to provide a flexible front end user interface, separating and decoupling the computer implemented user journey from computer implemented business process(es). The flexible front end user interface includes a plurality of portlets and a component-based object-oriented flow configuration to configure and/or navigate the flow of display screens. Various embodiments are described, including a computer implemented method of account opening using a flow configuration.

40 Claims, 28 Drawing Sheets

Related U.S. Application Data continuation-in-part of application No. 13/282,822, filed on Oct. 27, 2011, now Pat. No. 8,645,248, and a continuation-in-part of application No. 13/293,957, filed on Nov. 10, 2011, now Pat. No. 8,468,090, and a continuation of application No. PCT/US2011/037143, filed on May 19, 2011.

(60) Provisional application No. 61/435,000, filed on Jan. 21, 2011, provisional application No. 61/391,815, filed on Oct. 11, 2010, provisional application No. 61/405,398, filed on Oct. 21, 2010, provisional application No. 61/407,210, filed on Oct. 27, 2010, provisional application No. 61/435,000, filed on Jan. 21, 2011, provisional application No. 61/407,210, filed on Oct. 27, 2010, provisional application No. 61/435,000, filed on Jan. 21, 2011, provisional application No. 61/347,199, filed on May 21, 2010, provisional application No. 61/391,815, filed on Oct. 11, 2010, provisional application No. 61/405,398, filed on Oct. 21, 2010, provisional application No. 61/407,210, filed on Oct. 27, 2010, provisional application No. 61/435,000, filed on Jan. 21, 2011, provisional application No. 61/405,398, filed on Oct. 21, 2010, provisional application No. 61/407,210, filed on Oct. 27, 2010, provisional application No. 61/435,000, filed on Jan. 21, 2011.

(56) References Cited

U.S. PATENT DOCUMENTS

| | | | |
|---|---|---|---|
| 6,802,042 B2 | 10/2004 | Rangan | |
| 6,859,212 B2 | 2/2005 | Kumar | |
| 6,865,680 B1 | 3/2005 | Wu | |
| 6,867,789 B1 | 3/2005 | Allen et al. | |
| 6,871,220 B1 | 3/2005 | Rajan | |
| 6,871,346 B1 | 3/2005 | Kumbalimutt et al. | |
| 7,013,310 B2 | 3/2006 | Messing | |
| 7,085,997 B1 | 8/2006 | Wu | |
| 7,178,096 B2 | 2/2007 | Rangan | |
| 7,200,804 B1 | 4/2007 | Khavari | |
| 7,203,845 B2 | 4/2007 | Sokolic | |
| 7,225,464 B2 | 5/2007 | Satyavolu | |
| 7,313,813 B2 | 12/2007 | Rangan | |
| 7,321,874 B2 | 1/2008 | Dilip | |
| 7,321,875 B2 | 1/2008 | Dilip | |
| 7,383,223 B1 | 6/2008 | Dilip | |
| 7,424,520 B2 | 9/2008 | Daswani | |
| 7,505,937 B2 | 3/2009 | Dilip | |
| 7,536,340 B2 | 5/2009 | Dheer | |
| 7,571,140 B2 | 8/2009 | Weichert et al. | |
| 7,577,598 B2* | 8/2009 | Rousseau | G06Q 10/08 705/35 |
| 7,606,752 B2 | 10/2009 | Hazlehurst | |
| 7,644,023 B2 | 1/2010 | Kumar | |
| 7,657,761 B2 | 2/2010 | Sokolic | |
| 7,672,879 B1 | 3/2010 | Kumar | |
| 7,676,751 B2 | 3/2010 | Allen et al. | |
| 7,685,525 B2 | 3/2010 | Kumar | |
| 7,729,283 B2 | 6/2010 | Ferguson | |
| 7,734,541 B2 | 6/2010 | Kumar | |
| 7,797,207 B1 | 9/2010 | Dilip | |
| 7,856,386 B2 | 12/2010 | Hazlehurst | |
| 7,856,453 B2 | 12/2010 | Malik | |
| 7,873,677 B2 | 1/2011 | Messing | |
| 7,925,579 B1 | 4/2011 | Flaxman et al. | |
| 7,933,819 B2 | 4/2011 | Dumas et al. | |
| 8,744,967 B2* | 6/2014 | Pinski | G06Q 20/04 705/35 |
| 8,868,458 B1* | 10/2014 | Starbuck | G06Q 40/00 705/35 |
| 2001/0042785 A1* | 11/2001 | Walker et al. | 235/379 |
| 2002/0091635 A1 | 7/2002 | Dilip | |
| 2002/0156720 A1 | 10/2002 | Chow | |
| 2002/0165745 A1 | 11/2002 | Greene et al. | |
| 2002/0165993 A1 | 11/2002 | Kramer | |
| 2003/0069780 A1 | 4/2003 | Hailwood et al. | |
| 2003/0101131 A1 | 5/2003 | Warren | |
| 2003/0120593 A1 | 6/2003 | Bansal et al. | |
| 2003/0135457 A1 | 7/2003 | Stewart | |
| 2003/0158928 A1 | 8/2003 | Knox et al. | |
| 2003/0187741 A1 | 10/2003 | Brown et al. | |
| 2003/0208526 A1 | 11/2003 | Imanishi et al. | |
| 2003/0225692 A1 | 12/2003 | Bosch | |
| 2003/0236728 A1 | 12/2003 | Sunderji | |
| 2004/0015818 A1 | 1/2004 | McDonald et al. | |
| 2004/0019853 A1 | 1/2004 | Takizawa et al. | |
| 2004/0117302 A1* | 6/2004 | Weichert et al. | 705/40 |
| 2004/0230417 A1 | 11/2004 | Kraiss et al. | |
| 2004/0230516 A1 | 11/2004 | Crosthwaite | |
| 2005/0018249 A1 | 1/2005 | Miura et al. | |
| 2005/0125442 A1 | 6/2005 | Oxman et al. | |
| 2005/0144101 A1 | 6/2005 | Khandros | |
| 2005/0171833 A1 | 8/2005 | Jost et al. | |
| 2005/0187809 A1 | 8/2005 | Falkenhainer | |
| 2005/0246269 A1 | 11/2005 | Smith | |
| 2005/0262453 A1 | 11/2005 | Massasso | |
| 2006/0036954 A1 | 2/2006 | Satyadas et al. | |
| 2006/0075334 A1 | 4/2006 | Sato | |
| 2006/0101393 A1 | 5/2006 | Gerkin et al. | |
| 2006/0116949 A1 | 6/2006 | Wehunt | |
| 2006/0143107 A1* | 6/2006 | Dumas et al. | 705/36 R |
| 2006/0195816 A1 | 8/2006 | Grandcolas et al. | |
| 2006/0230343 A1 | 10/2006 | Armandpour | |
| 2006/0253463 A1 | 11/2006 | Wu | |
| 2007/0022027 A1 | 1/2007 | Gupta et al. | |
| 2007/0061254 A1 | 3/2007 | Blunck | |
| 2007/0067239 A1 | 3/2007 | Dheer | |
| 2007/0089047 A1* | 4/2007 | Joshi | 715/501.1 |
| 2007/0130347 A1 | 6/2007 | Rangan | |
| 2007/0180380 A1 | 8/2007 | Khavari | |
| 2007/0244816 A1 | 10/2007 | Patni | |
| 2007/0282627 A1 | 12/2007 | Greenstein et al. | |
| 2008/0080017 A1 | 4/2008 | Ishizuka et al. | |
| 2008/0082454 A1 | 4/2008 | Dilip | |
| 2008/0086403 A1 | 4/2008 | Dilip | |
| 2008/0086426 A1 | 4/2008 | Dilip | |
| 2008/0091591 A1 | 4/2008 | Egnatios | |
| 2008/0091593 A1 | 4/2008 | Egnatios | |
| 2008/0091600 A1 | 4/2008 | Egnatios | |
| 2008/0098030 A1 | 4/2008 | Edd et al. | |
| 2008/0177848 A1* | 7/2008 | Wakhlu | 709/206 |
| 2008/0189185 A1 | 8/2008 | Matsuo | |
| 2008/0208737 A1 | 8/2008 | Dilip | |
| 2008/0262901 A1 | 10/2008 | Banga et al. | |
| 2008/0275816 A1 | 11/2008 | Hazlehurst | |
| 2008/0288376 A1 | 11/2008 | Panthaki | |
| 2008/0288400 A1 | 11/2008 | Panthaki | |
| 2008/0288861 A1 | 11/2008 | Jones et al. | |
| 2008/0301023 A1 | 12/2008 | Patel | |
| 2008/0306846 A1 | 12/2008 | Ferguson | |
| 2009/0006582 A1 | 1/2009 | Daswani | |
| 2009/0007098 A1 | 1/2009 | Chevrette et al. | |
| 2009/0024505 A1 | 1/2009 | Patel | |
| 2009/0030771 A1 | 1/2009 | Eder | |
| 2009/0048999 A1 | 2/2009 | Gupta et al. | |
| 2009/0112753 A1 | 4/2009 | Gupta et al. | |
| 2009/0234466 A1 | 9/2009 | Kunze | |
| 2009/0265211 A1 | 10/2009 | May et al. | |
| 2009/0276359 A1 | 11/2009 | Panthaki | |
| 2010/0030687 A1 | 2/2010 | Panthaki | |
| 2010/0063896 A1 | 3/2010 | Rose | |
| 2010/0094878 A1 | 4/2010 | Soroca et al. | |
| 2010/0121677 A1* | 5/2010 | An et al. | 705/10 |
| 2010/0205065 A1 | 8/2010 | Kumar | |
| 2010/0205079 A1 | 8/2010 | Ferguson | |
| 2010/0217662 A1 | 8/2010 | Ramer et al. | |
| 2010/0293447 A1 | 11/2010 | Kadowaki et al. | |

(56) References Cited

U.S. PATENT DOCUMENTS

2010/0299286 A1 11/2010 Dilip
2011/0029491 A1 2/2011 Joshi et al.

OTHER PUBLICATIONS

International Search Report and Written Opinion from International application No. PCT/US11/55767, issued Mar. 7, 2012.

International Search Report and Written Opinion from International application No. PCT/US11/056839, issued Mar. 8, 2012.

International Search Report and Written Opinion from International application No. PCT/US11/37143, issued Sep. 21, 2011.

International Search Report and Written Opinion from International application No. PCT/US12/22022, issued May 8, 2012.

\* cited by examiner

| PORTLET | DESCRIPTION |
|---|---|
| CAPTURE INSTRUCTION | CREATES A NEW PAYMENT INSTRUCTION |
| INSTRUCTION LIST | PROVIDES A LIST OF ALL HISTORIC AND UPCOMING PAYMENT INSTRUCTIONS |
| INSTRUCTION DETAILS | DISPLAYS THE DETAILS OF A SINGLE PAYMENT INSTRUCTION. |
| EDIT INSTRUCTION | UPDATES A PAYMENT INSTRUCTION. |
| DELETE INSTRUCTION | DELETES A PAYMENT INSTRUCTION. |
| ADD FUNDING SOURCE | ADDS A FUNDING SOURCE TO THE CUSTOMER'S "FROM" ACCOUNT LIST. |
| ADD BENEFICIARY | LINKS AN ACCOUNT (INDIVIDUAL, BUSINESS OR BILL) TO THE CUSTOMER'S "TO" ACCOUNT LIST. |
| DELETE LINKED ACCOUNT | REMOVES A LINKED ACCOUNT FROM THE "TO" OR "FROM" CUSTOMER ACCOUNT LIST. |
| LINKED ACCOUNT DETAILS | FUNCTIONALITY FOR VIEWING THE DETAILED INFORMATION RELATED TO AN ACCOUNT THAT HAS BEEN LINKED WITH A CUSTOMER'S PROFILE. |
| LINKED ACCOUNT LIST | PROVIDES A LIST OF ACCOUNTS LINKED TO A CUSTOMER'S PROFILE. |
| EDIT LINKED ACCOUNT | UPDATES A CUSTOMER LINKED ACCOUNT. |
| CURRENCY CALCULATOR | A CURRENCY EXCHANGE RATE CALCULATOR. |

FIG. 3

© COOPERATIVE - ENABLE THIS PORTLET TO SEND DATA

DESCRIBE THE TYPE OF DATA BEING SENT
TO SEND DATA TO ANOTHER PORTLET DESCRIBE THE TYPE OF DATA THIS PORTLET CAN TRANSFER.

--- DESCRIBE THE TYPE OF DATA BEING SENT ---

ENTER A URI THAT UNIQUELY IDENTIFIES THE SOURCE DATA TYPE. A TARGET PORTLET DESCRIBING AN IDENTICAL DATA TYPE CAN RECEIVE THIS DATA.

DATA TYPE URI: [ HTTP://AO#VALIDATEIDENTITY ]
EXAMPLE: HTTP://NAMESPACE#DATATYPE

SELECT A JAVA CLASS THAT DEFINES THE TYPE OF DATA BEING TRANSFERRED.

JAVA TYPE: [ JAVA.LANG.STRING ] [ BROWSE... ]

[ < BACK ] [ NEXT > ] [ FINISH ] [ CANCEL ]

FIG. 16

COOPERATIVE - ENABLE THIS PORTLET TO SEND DATA

PROPERTY TRANSFER

DECLARE THE SOURCE ACTION AND HOW THE PROPERTY IS TRANSFERRED TO THE PROPERTY BROKER.

SOURCE ACTION

IN JSR 168 PORTLETS, THE PROPERTY TRANSFER IS TRIGGERED WHEN THE ACTION ERQUEST CONTAINS THE "ACTION PARAMETER" SET TO THE "ACTION VALUE".

ACTION PARAMETER: WIRE_ACTION

ACTION VALUE: SENDACTIONGAD

PROPERTY TRANSFER

SPECIFY THE PROPERTY NAME AND LOCATION WHERE THE OUTPUT PROPERTY WILL BE STORED SO THAT IT CAN BE RETRIEVED BY THE PROPERTY BROKER.

LOCATION: REQUEST ATTRIBUTE

PROPERTY NAME: VALIDATEIDENSCREENID

[< BACK] [NEXT >] [FINISH] [CANCEL]

○ COOPERATIVE - ENABLE THIS PORTLET TO RECEIVE DATA

DESCRIBE THE TYPE OF DATA BEING RECEIVED
TO RECEIVE DATA FROM ANOTHER PORTLET DESCRIBE THE TYPE OF DATA THIS PORTLET CAN ACCEPT.

─── DESCRIBE THE TYPE OF DATA BEING RECEIVED ───

ENTER A URI THAT UNIQUELY IDENTIFIES THE TARGET DATA TYPE. THIS PORTLET CAN RECEIVE DATA FROM A SOURCE PORTLET THAT DESCRIBES AN IDENTICAL DATA TYPE.

DATA TYPE URI: HTTP://AO#VALIDATEIDENTITY

EXAMPLE: HTTP://NAMESPACE#DATATYPE

SELECT A JAVA CLASS THAT DEFINES THE TYPE OF DATA BEING TRANSFERRED.

JAVA TYPE: JAVA.LANG.STRING      BROWSE...

[< BACK]  [NEXT >]  [FINISH]  [CANCEL]

FIG. 21

◉ COOPERATIVE - ENABLE THIS PORTLET TO RECEIVE DATA

PROPERTY TRANSFER

DECLARE THE TARGET ACTION AND HOW THE PROPERTY IS TRANSFERRED TO THE TARGET PORTLET.

─ TARGET ACTION ─

IN JSR 168 PORTLETS, THE PORTAL INVOKES AN ACTION ON THE TARGET PORTLET IN ORDER TO PROCESS THE INPUT PROPERTY. SPECIFY THE ACTION PARAMETER AND VALUE.

ACTION PARAMETER: WIRE_ACTION

ACTION VALUE: RECEIVEACTION

─ PROPERTY TRANSFER ─

SPECIFY THE PROPERTY NAME AND LOCATION WHERE THE PROPERTY BROKER WILL PLACE THE INPUT PROPERTY DURING TRANSFER SO THE TARGET PORTLET CAN RETRIEVE IT.

LOCATION: REQUEST PARAMETER

PROPERTY NAME: SCREENID

[ BROWSE... ]

[ < BACK ] [ NEXT > ] [ FINISH ] [ CANCEL ]

FIG. 22

ACCOUNT OPENING FLOW CONFIGURATION COMPUTER SYSTEM AND PROCESS FOR IMPLEMENTING SAME

RELATED APPLICATIONS

This application claims the benefit of, and priority to, U.S. Provisional Application No. 61/435,000, filed Jan. 21, 2011, entitled "Account Opening Flow Configuration: Navigation Interceptor and Portlet Wiring."

This application is a continuation-in-part of U.S. application Ser. No. 13/270,831, filed Oct. 11, 2011, entitled "Computer Architecture and Process for Application Processing Engine," which claims the benefit of U.S. Provisional Application No. 61/391,815, filed Oct. 11, 2010, U.S. Provisional Application No. 61/405,398, filed Oct. 21, 2010, U.S. Provisional Application No. 61/407,210, filed Oct. 27, 2010, and U.S. Provisional Application No. 61/435,000, filed Jan. 21, 2011.

This application is a continuation-in-part of U.S. application Ser. No. 13/276,956, filed Oct. 19, 2011, entitled "Computer Metrics System and Process for Implementing Same," which claims the benefit of U.S. Provisional Application No. 61/405,398, filed Oct. 21, 2010, U.S. Provisional Application No. 61/407,210, filed Oct. 27, 2010, and U.S. Provisional Application No. 61/435,000, filed Jan. 21, 2011.

This application is a continuation-in-part of U.S. application Ser. No. 13/282,822, filed Oct. 27, 2011, entitled "Integrated Customer Communications Computer System and Process for Implementing Same," which claims the benefit of U.S. Provisional Application No. 61/407,210, filed Oct. 27, 2010, and U.S. Provisional Application No. 61/435,000, filed Jan. 21, 2011.

This application is a continuation-in-part of U.S. application Ser. No. 13/293,957, filed Nov. 10, 2011, entitled "Account Opening Computer System Architecture and Process for Implementing Same," which is a continuation of PCT Application No. PCT/US2011/037143, filed May 19, 2011, which claims the benefit of U.S. Provisional Application No. 61/347,199, filed May 21, 2010, U.S. Provisional Application No. 61/391,815, filed Oct. 11, 2010, U.S. Provisional Application No. 61/405,398, filed Oct. 21, 2010, U.S. Provisional Application No. 61/407,210, filed Oct. 27, 2010, and U.S. Provisional Application No. 61/435,000, filed Jan. 21, 2011.

Each of the above applications is incorporated herein by reference in its entirety.

BACKGROUND

Emerging systems and methods lack straight through computer processing (STP) for a variety of technological and/or computer driven processes to support both flexibility and global consistency, to standardize processes for an enhanced customer experience, and to reduce the need for IT support and other development resources. We have determined, however, that an organization's global footprint, economies of scale, and local expertise can all be leveraged for the benefit of computer service and/or resource users globally.

We have developed mechanisms to configure and/or navigate the flow of display screens, including, for example, the use of a multi-step portlet in an account opening computer system without the need for IT change. We have also developed mechanisms to configure and/or navigate the flow of display screens, including the functionality of moving from portlet to portlet in, for example, a display screen flow.

SUMMARY

In one aspect, the invention provides an account opening computer system that includes a flexible front end user interface (UI) implemented by the computer system, and which separates and decouples a computer implemented user journey from a computer implemented business process. The flexible front end user interface includes a plurality of portlets, each providing at least one functionality or a group of functionalities to be executed by said computer system, and a component-based object-oriented flow configuration defining software instructions implemented by said computer system to perform the computer implemented front end user journey. The component-based object-oriented flow configuration provides navigation functionality across said plurality of portlets, and manages data for computer screen displays in UI object components.

The component-based object-oriented flow configuration may include, for example, a process object element defining a process of the component-based flow that renders at least part of a computer screen display, and an action object element managing events that occur within a state of the process and driving screen navigations used in rendering the computer screen display.

In some embodiments, the flexible front end user interface provides a business user functionality to deploy champion and challenger user journeys and business processes, and determine an effective user journey responsive to predetermined criteria based on at least one of completion time and completion rate.

In some embodiments, the flexible front end user interface captures processing data to detect where a user journey or a business process may be defective or ineffective responsive to predetermined criteria.

In some embodiments, the flexible front end user interface provides a business user functionality to determine whether a user journey or a business process is defective responsive to predetermined criteria and, when the user journey or the business process is defective, to deploy a new user journey.

In some embodiments, the account opening computer system manages the user journey and the business process substantially separately so that the user journey and the business process can be modified with substantially minimum impact to one another.

In some embodiments, the plurality of portlets provide macro services that are configured, based one or more runtime parameters, to execute one or more micro services to fulfill a user request.

In some embodiments, the business process can be enhanced by at least one of modifying the composition of the macro services and changing the behaviors of the micro services.

In some embodiments, the computer implemented front end user journey is configurable so that the screen flow can be altered.

In some embodiments, the flexible front end user interface provides configurable service invocation so that service calls can be linked to buttons in Java Server Pages (JSPs).

In some embodiments, the flexible front end user interface provides functionality to save an application and finish a front end session, and to retrieve the application at a later time and resume from where the application was saved.

In some embodiments, the UI object components comprise logical groups of data instead of data in individual fields.

In some embodiments, each portlet is packaged in a web application archive (WAR). In some embodiments, the plurality of portlets are wired to each other. In some embodiments, the portlet wiring is defined in a Web Services Description Language (WSDL) file in the WAR. In some embodiments, the data for the computer screen displays are passed on the wire.

In some embodiments, each portlet includes a flow navigator processor object determining the next step and, when the next step is defined in another portlet, establishing a request attribute to trigger a wire to the other portlet to execute the next step. In some embodiments, the flow navigator processor object uses a step-mapping configuration to determine if the next step is defined in a different portlet. In some embodiments, triggering the wire comprises an initiating portlet sending a flow ID and a step ID as wired parameters to a target portlet.

In some embodiments, the component-based object-oriented flow configuration further comprises an action-step object element defining an action handled by a branch class. In some embodiments, the action object element includes a branch-reference attribute indicating branch logic to be analyzed. In some embodiments, the component-based object-oriented flow configuration further comprises an option object element identifying a conditional output of a branch. The branches may be processor objects and/or service classes.

In some embodiments, a step ID and an action ID are mapped to an event defined in an executions services (ES) configuration.

In some embodiments, the flexible front end user interface comprises a Manage Instruction WAR including Capture Instruction, Instruction List, Instruction Details, Delete Instruction, and Edit Instruction portlets; a Currency Calculator WAR including a Currency Calculator portlet; and a Manage Linked Accounts WAR comprising Add Funding Source, Add Beneficiary, Delete Linked Account, Linked Account Details, Linked Account List, and Edit Linked Account portlets.

In another aspect, the invention provides a method of opening an account for a user via a flexible front end user interface (UI) implemented by an account opening computer system and separating and decoupling a computer implemented user journey from a computer implemented business process. In various embodiments, the method includes providing a plurality of portlets, each providing at least one functionality or a group of functionalities to be executed by said computer system, and providing a component-based object-oriented flow configuration defining software instructions implemented by said computer system to perform the computer implemented front end user journey, providing navigation functionality across said plurality of portlets, and managing data for computer screen displays in UI object components.

In some embodiments, the component-based object-oriented flow configuration includes a process object element defining a process of the component-based flow that renders at least part of a computer screen display, and an action object element managing events that occur within a state of the process and driving screen navigations used in rendering the computer screen display.

In some embodiments, the computer implemented method further comprises deploying champion and challenger user journeys and business processes, and determining an effective user journey responsive to predetermined criteria based on at least one of completion time and completion rate.

In some embodiments, the computer implemented method further comprises capturing processing data to detect where a user journey or a business process may be defective or ineffective responsive to predetermined criteria, and when the user journey or the business process is defective, deploying a new user journey.

In some embodiments, the computer implemented method further comprises managing the user journey and the business process substantially separately so that the user journey and the business process can be modified with substantially minimum impact to one another.

In some embodiments, the computer implemented method further comprises providing a visual editor generating said component-based object-oriented flow configuration.

In some embodiments, the computer implemented method further comprises providing at least one portlet providing functionality to save an application and finish a front end session, and to retrieve the application at a later time and resume from where the application was saved.

In some embodiments, the computer implemented method further comprises providing a flow navigator processor object determining the next step and, when the next step is defined in another portlet, establishing a request attribute to trigger a wire to the other portlet to execute the next step.

In some embodiments, the computer implemented method further comprises providing said component-based object-oriented flow configuration comprising at least one of an action-step object element defining an action handled by a branch class, an action object element including a branch-reference attribute indicating branch logic to be analyzed, and an option object element identifying a conditional output of a branch.

In still another aspect, the invention provides computer implemented method of providing a user with a flexible front end user interface (UI) that separates and decouples a computer implemented user journey from a computer implemented application process. The computer implemented method comprises providing a plurality of portlets, each providing at least one functionality or a group of functionalities to be executed by the computer system; executing the computer implemented front end user journey using a component-based object-oriented flow configuration defining software instructions implemented by the computer system, providing navigation functionality across the plurality of portlets, managing data for computer screen displays in UI object components; defining a process of the component-based flow that renders at least part of a computer screen display; and managing events that occur within a state of the process and driving screen navigations used in rendering the computer screen display.

In some embodiments, this computer implemented method further comprises managing the user journey and the business process substantially separately so that the user journey and the business process can be modified with substantially minimum impact to one another. In some embodiments, the computer implemented method further comprises providing a visual editor generating said component-based object-oriented flow configuration. In some embodiments, the computer implemented method further comprises providing at least one portlet providing functionality to save an application and finish a front end session, and to retrieve the application at a later time and resume from where the application was saved.

In some embodiments, the computer implemented method further comprises providing a plurality of portlets comprising an Entry portlet, a Gather-Application-Data portlet, a Decision portlet, a Funding portlet, a Boarding portlet, and a Cross-sell portlet.

In some embodiments, the computer implemented method further comprises providing a plurality of core products portlets comprising at least one of: Retrieve Application Portlet, Non-Straight Through Processing Application Maintenance Menu Portlet, Account Opening (AO) Work Item Update Portlet, Communication History Portlet. AO Activity History Portlet, AO Queue Management Services Portlet, AO To-Do Items Portlet, AO Entity Data Portlet, AO Application Documentation Portlet, AO Communication Portlet, Integrated Customer Communications Manager Free Format Utility Portlet, and AO Entitlement Portlet.

In some embodiments, the computer implemented method further comprises providing a plurality of insurance portlets comprising a Quotes Portlet, an AS Entry Portlet, and a Policy Cancellation Portlet; determining and presenting an insurance quote by the Quotes Portlet; receiving from the user an acceptance of the insurance quote; and initiating the computer implemented front end user journey responsive to said acceptance.

BRIEF DESCRIPTION OF THE DRAWINGS

FIG. 3 is a diagram showing exemplary WARs and Portlets for payment.

FIGS. 15-19 show screenshots for enabling a portlet to send data.

FIGS. 20-24 show screenshots for enabling a portlet to receive data.

DETAILED DESCRIPTION

Figure 1:
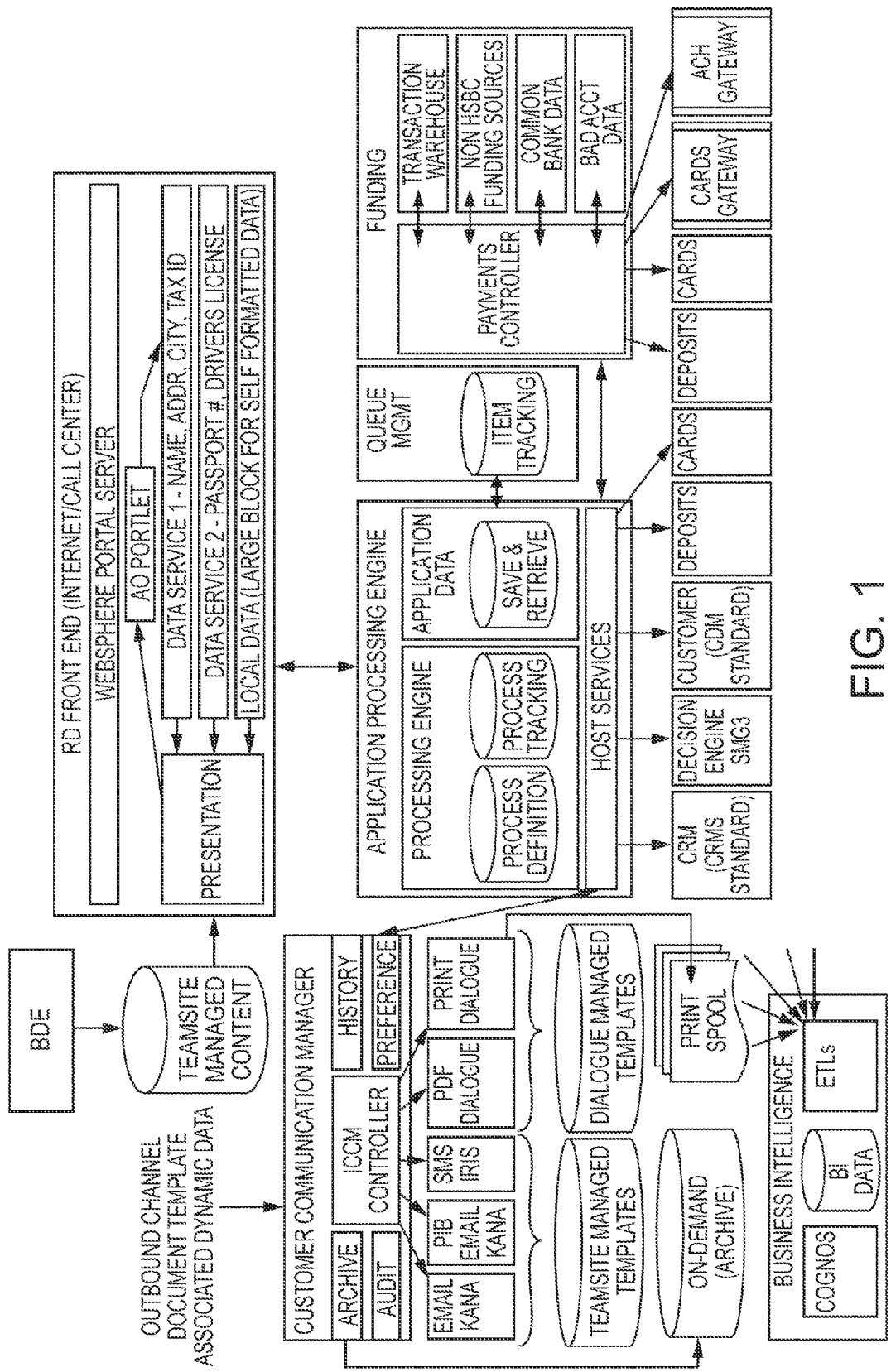
FIG. 1 is an exemplary diagram showing how a front end flow configuration may interface with various account opening product/service systems or data stores, according to some embodiments of the invention.

FIG. 1 is an exemplary diagram of an Account Opening (AO) system supported by the flow configuration of the present invention. The system may include, for example, Front End (FE), Application Processing Engine (APe), Integrated Customer Communications Manager (ICCM), Metrics and Business Intelligence (BI), Funding, and/or Queue Management Services (QMS).

In some embodiments, Account Opening computer systems and processes preferably include a variety of features, such as Test and Learn, Business Intelligence, and/or Quick Deployment Cycles. Test and Learn functionality, for example, can allow a business to deploy champion and/or challenge user journeys, as well as business processes, and promote the one that is more effective (e.g., faster completion time or higher application completion rate). Business Intelligence can allow the business to capture processing data for analysis so that the business can understand where a user journey or a business process may be broken or ineffective. Quick Deployment Cycles can allow the business to deploy a new user journey in a timely manner, if a user journey or a business process is not working. In order to support the above objectives, the flow configuration is designed as follows.

The account opening front end (FE) is implemented as multiple user journeys. Each journey comprises a sequence of screens that allows the user to enter data and interact with the system in a manner that optimizes user experience. The process defines the internal procedures that are needed to process an application. Each business process is optimized to enhance back office efficiency.

Advantageously, the system is designed in a loosely coupled way, so that the user journey and the underlying bank process can be defined and managed separately and the user journey can be tuned and/or modified with minimum impact to the bank process and vice versa.

The system preferably includes an Application Processing Engine (APe) to manage the account opening business process, which is effectively the business process manager (BPM) for account opening. The FE provides the human interaction elements of the business flow and APe implements the systematic elements of the business process and provides the state management of the overall process.

In some embodiments, two types of macro-services are provided to (1) save application data, and (2) process user actions (e.g., submitting the application for decision and accepting an offer to open an account).

The macro-services are configured, based on a number of runtime parameters (e.g., the product type or entity ID), to execute one or more micro-services to fulfill the user request. By modifying the composition of macro-services or changing the behaviors of micro-services, the business process can be enhanced as needed. As long as the preconditions are met, the FE user journey would not know the behavior of a macro-service.

In some embodiments, the FE user journey is defined in a configurable way so that the screen flow can be altered. Service invocation is also preferably configurable so that the service calls can be linked to buttons in one Java Server Page (JSP) or another. This can allow the user journey to be changed while calling the macro-services in the same order to preserve the same business process, or can allow use of the same user journey while executing the macro-services in a different order, thus executing a different business process.

A flexible user interface (UI) provides a way to define the user journey/flow of screens. The flexible user interface also provides a way to alter the content and look-and-feel of the individual screens, such as add/remove form elements from screens, add/remove content fragment in the screens, change the layout or color schemes of the screen, etc.

Figure 2:
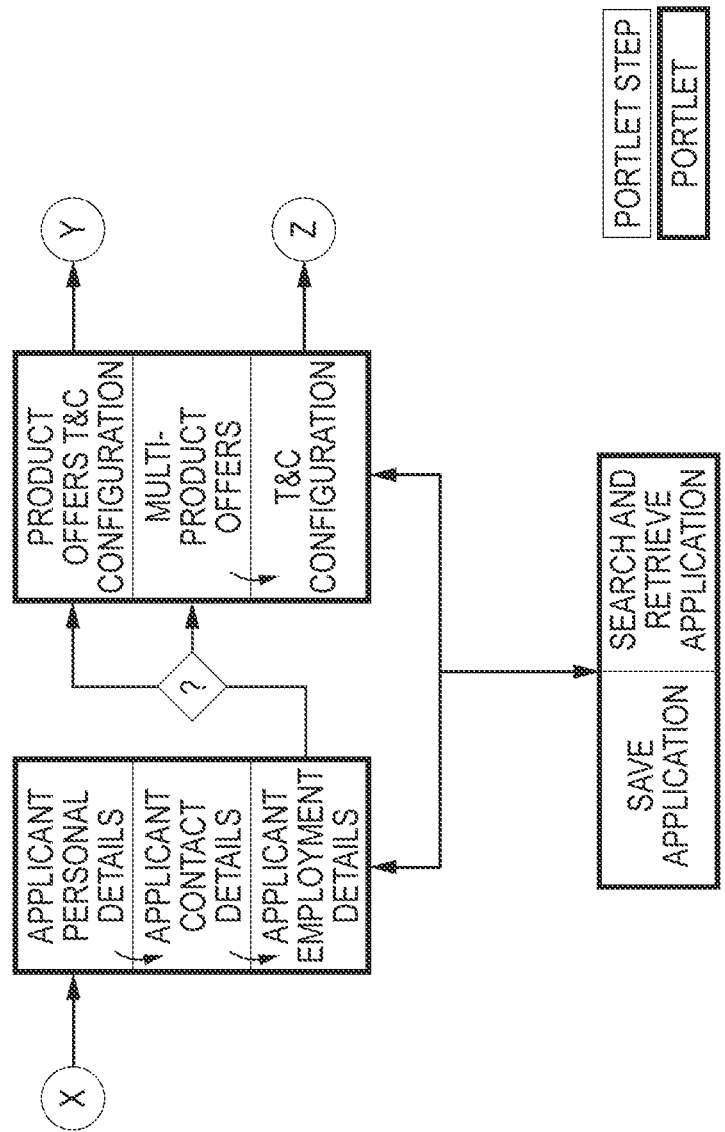
FIG. 2 shows an exemplary User Journey within and across Portlets.

FIG. 2 shows a portion of an exemplary user journey (flow) where customer information is captured to apply for a product. From "X", where the customer had indicated interest in one or more products, customer information is captured in three steps: personal data, contact details, and employment information. If only a single product is selected, the single offer-and-configuration step is shown; otherwise, the multi-product offer step is shown, which allows the customer to pick the desired product to configure (select eStatement, order check-books, etc.). After the offer-and-configuration steps, the customer may be led to different places ("Y", "Z"). On any of the steps within the overall journey, the customer has the option to "save" the application and finish the front-end session. The customer could then retrieve the application at a later time and resume from the step where he/she had saved.

In some embodiments, there may be an alternative flow, running the same time as the above flow, where, for example, the employment information is not captured. The original flow and the alternative flow may then be assigned to customers. The user journey definition is preferably externalized and configurable so that flow can be changed without the need for a full release/deployment. In some embodiments, a step may be inserted and/or removed within the flow, for example, to add an advertisement between the "contact detail" and the "employment information" steps. The user journey is preferably decomposed into small modules so that smaller set of logic can be deployed without causing full deployment and testing. Thus, deployment impact can be minimized if only part of the business logic has changed.

To support these account opening features, the present invention advantageously provides in some embodiments multiple portlets and Web Application Archives (WARs). Each portlet can provide a single or a group of logically related functionality so that the portlet is self-contained and potentially reusable for other use cases. Some exemplary WARs and portlets for payment are shown in FIG. 3.

In various embodiments, Account Opening portlets may include, for example, one or more of the following:
   Entry portlet—manages the initial request to start the account opening process. Flow-ID, and business process-id, for example, may be passed to the entry portlet.
   Gather-Application-Data portlet—defines steps to capture applicant information such as personal data, contact data and employment information.
   Decision portlet—in some embodiments, includes three parts: decision outcome, T&C and product configuration. (1) Decision portlet displays which product is approved/denied/pending. (2) For approved products, T&C is displayed for the user to accept the product. (3) After the user accepts the product, screens are shown for production configuration, such as eStatement configuration or order check-book. Configurations are shown based on the product type and/or user type.
   Funding portlet—captures payments and fee instructions required for the application and products.
   Boarding portlet—displays the final confirmation (Application Summary) screen to the user. It will remind the user with any pending tasks that are not yet completed, such as providing proof of identity.
   Cross-sell portlet—promote other products the client doesn't already have. The customer already captured in an existing application will be copied over when starting a new application when the user clicks on the cross-sell product.

In some embodiments, one or more of the following portlets are provided for core products: Retrieve Application Portlet, Non-STP Application Maintenance Menu Portlet, AO Work Item Update Portlet, Communication History Portlet, AO Activity History Portlet, AO QMS Portlet, AO To-Do Items Portlet, AO Entity Data Portlet, AO Application Documentation Portlet, AO Communication Portlet, ICCM Free Format Utility Portlet, and/or AO Entitlement Portlet.

In some embodiments, additional servicing functions may be provided based on the same flow configuration design. Such services are not necessarily part of account opening, but also have flows and steps that can be monitored and enhanced. For example, for Insurance, a Quotes Portlet, Account Servicing Entry Portlet, and/or Policy Cancellation Portlet may be provided. The Quotes portlet allows the end user to enter minimum insurance data, such as personal information, smoking/drinking habit, etc. to obtain one or more insurance quotes from different source/vendor systems. In some embodiments, once the user accepts a quote, an AO application process will be started.

Figure 4:
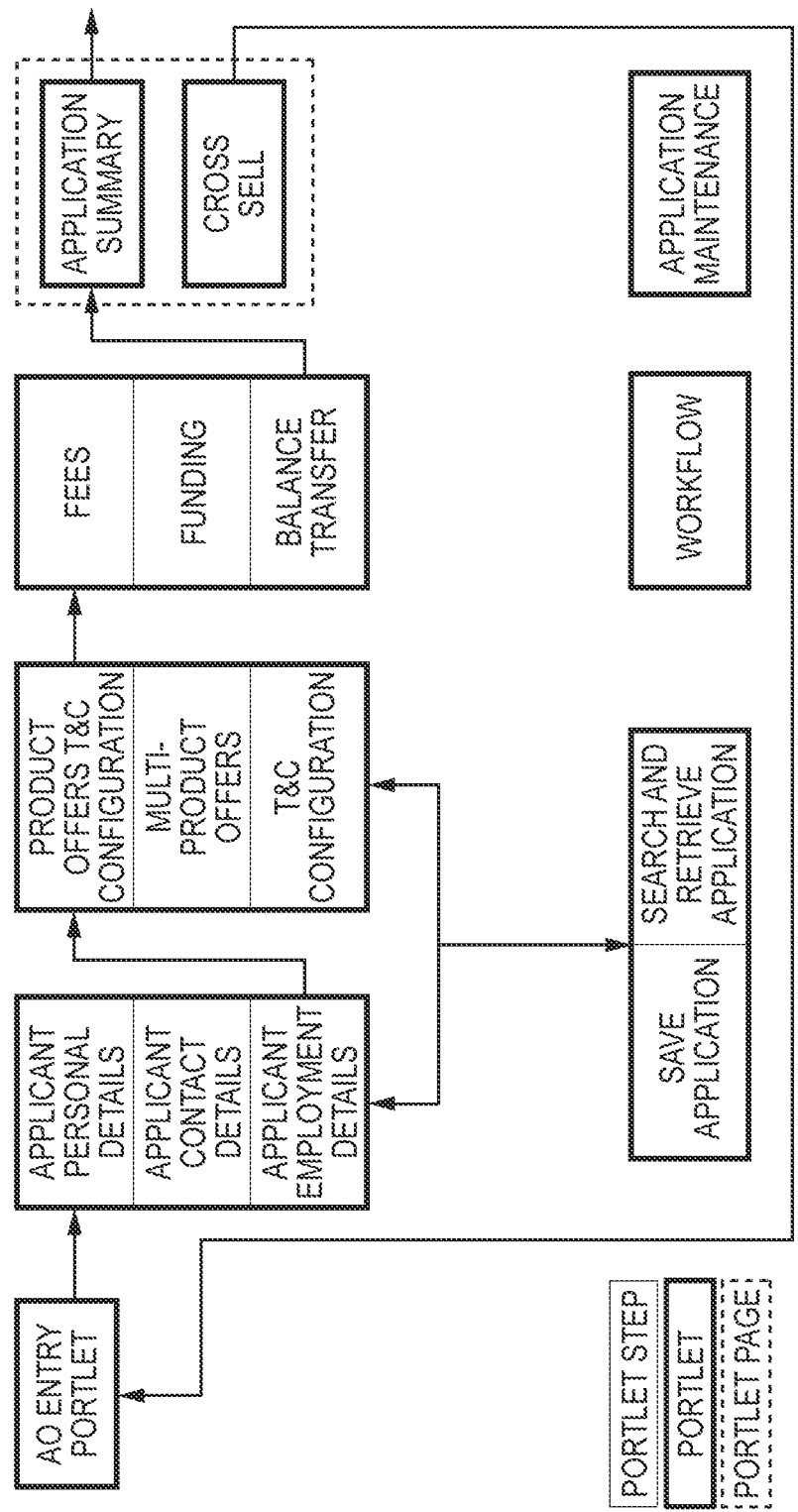
FIG. 4 is an exemplary diagram of Account Opening Portlets that may be chained together in various ways to create a flexible user journey.

To facilitate a flexible user journey, multiple portlets can be chained together to create the desired journey. Flexibility is provided through linking together and/or chaining the multiple portlets and externalizing business controlled view elements without the business being required to know the technical implementation of the underlying business processes. FIG. 4 is an exemplary diagram showing how front end portlets that may be chained together in various ways to create the flexible user journey.

A consolidated user journey configuration is defined that can be managed with minimal technical skill. The configuration details are preferably not spread across multiple files because such a scenario increases the risk of errors of omission while creating or modifying flows and increases the time-to-market for the application, which is something the business wants to avoid. The structure and content of the configuration files are preferably easily understandable so that flows can be created and modified by people with little technical knowledge.

The invention also manages navigation across portlets. From a business/user perspective a flow is just a series of screens. So the configuration preferably supports page navigation across portlets. However, the details of which screen belongs to which portlet are not necessarily exposed to the person creating or modifying a flow.

Proper configurations ensure that the appropriate logic falls into the right portlet. For example, it is not desirable to execute the decision logic in the portlet that gathers the application information and determine if the "accepted" screen or the "declined" screen should be displayed. Instead, the control should be passed to the decision portlet, which makes the decision call and determine what happens next.

To fulfill the flexibility at the screen level without introducing too much complexity in the code, in some embodiments, data are managed as logical groups (referred to as UI Components), instead of managing data as individual fields. This allows the data group to be advantageously moved around within a screen or across different screens. Thus existing screens can be modified by adding/removing UI Components and new screens can be created by putting together a set of UI Components.

Figure 5:
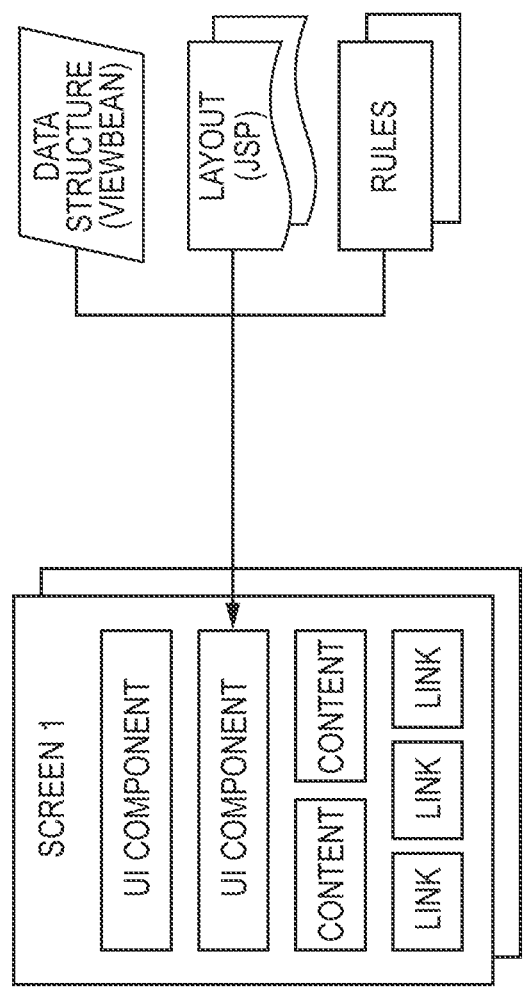
FIG. 5 shows an exemplary logical view of the front end user interface.

FIG. 5 shows an exemplary logical view of a front end user interface. The screens are composed of UI Components, Content, and Links. The UI Component may be further broken down into Data Structures, Layout (including attributes such as 'read-only'), and validation Rules (for individual fields within that UI component). The Content section allows for business-defined content, and the Links allow the user to perform actions. The view components may be deployable as content by the business from a Business Development Environment (BDE).

Figure 6:
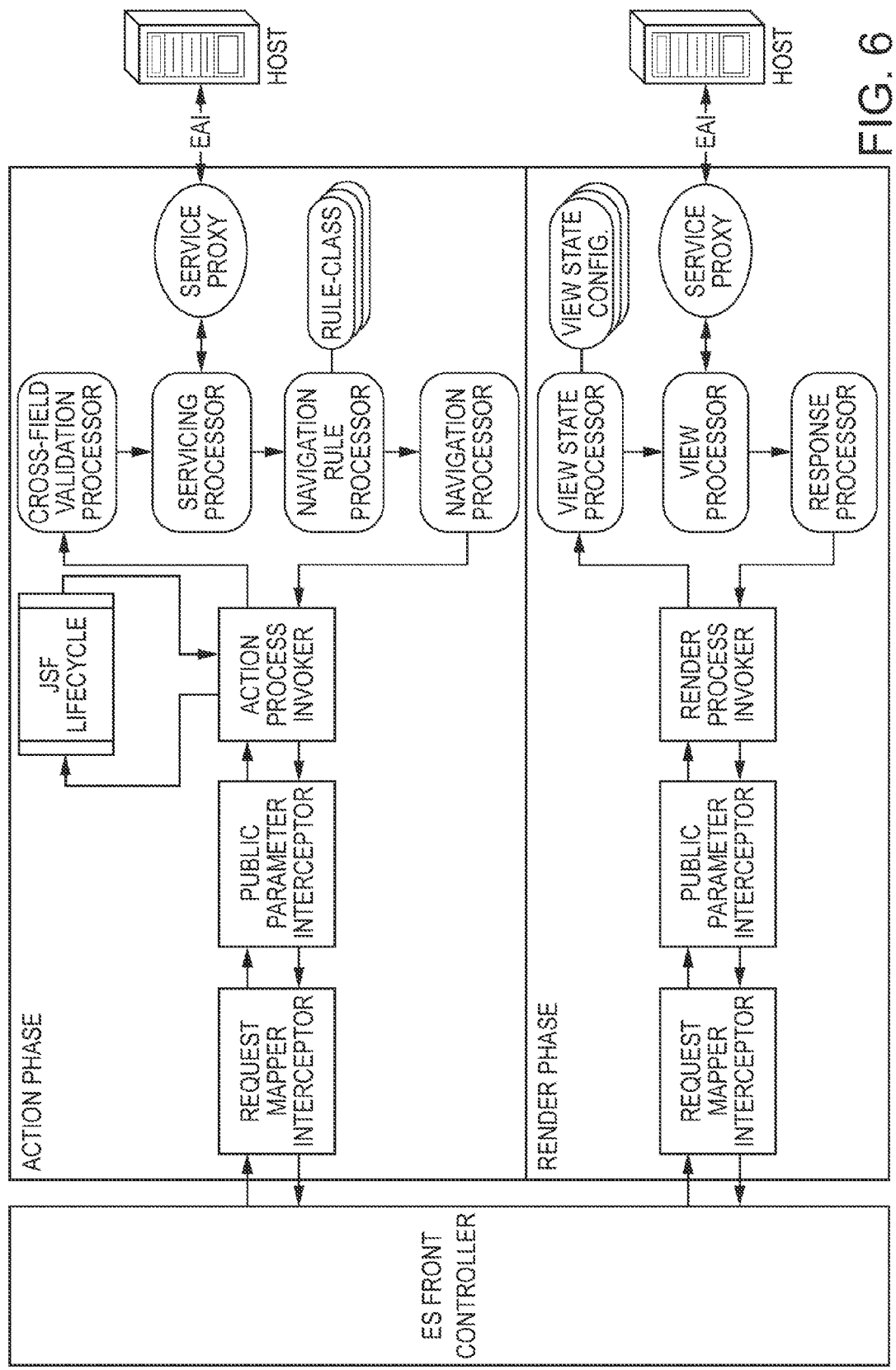
FIG. 6 illustrates an exemplary physical architecture of the front end, according to some embodiments.

FIG. 6 illustrates an exemplary FE physical architecture according to some embodiments. A generic Action/Render phase is shown. The Service Proxy is the exit point from the FE to the host systems, of which APe is a focus, through Enterprise Application Integration (EAI). Executions Services (ES) refers to a framework used for software development based on Java, J2EE and/or Portlet technologies. ES Front Controller is a key component in the framework that in some embodiments is utilized by all portlets developed for AO.

Figure 7:
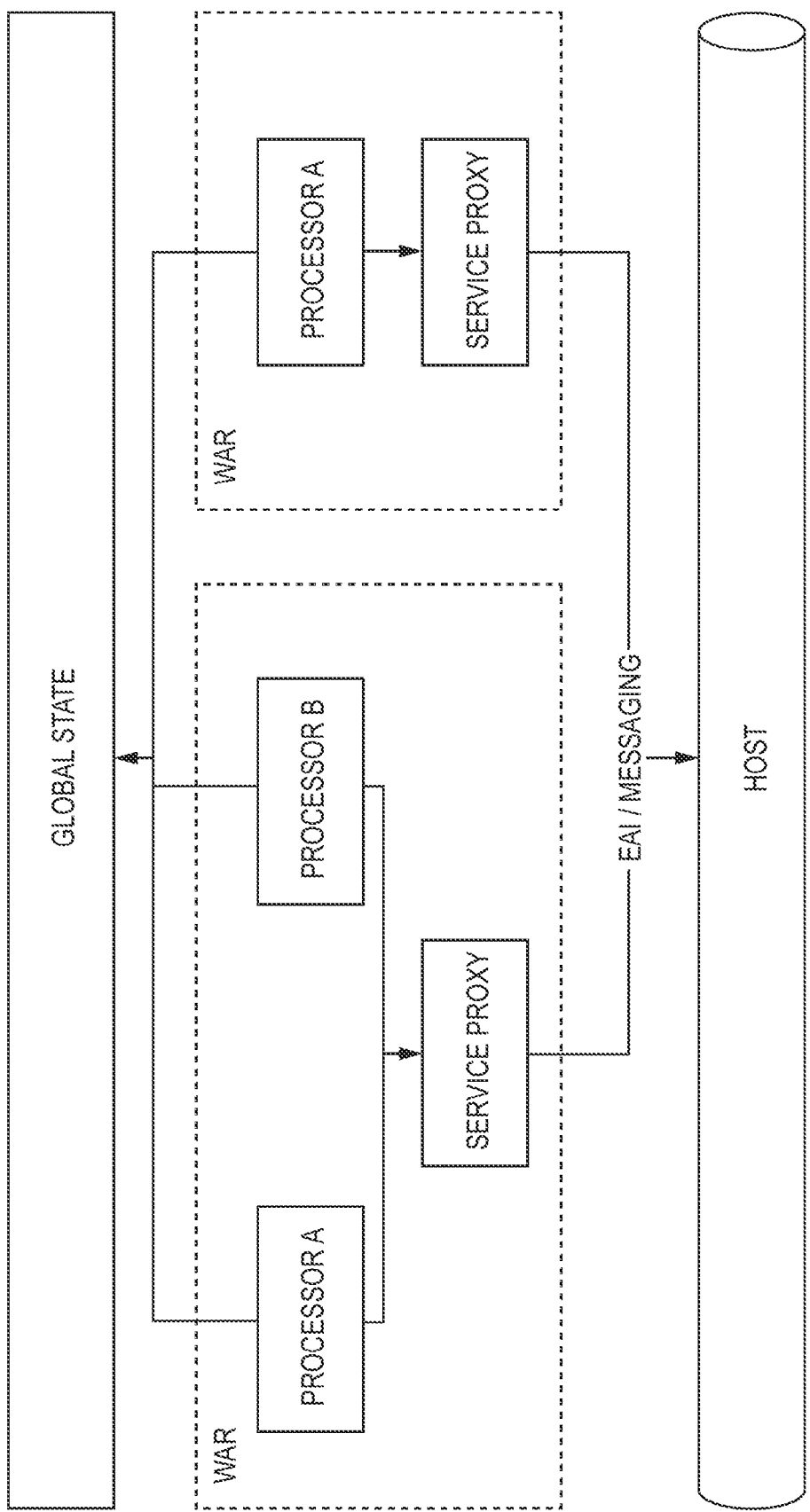
FIG. 7 is an exemplary diagram showing data passed into global state.

In some embodiments, a Public Parameter Interceptor enables collaboration of multiple portlets within a single portal instance. A declared parameter is passed to other portlets that declare the same parameter. The parameter is injected into the work-context, also via configuration, for the portlet to use. AO may use this mechanism to accept input data, such as entity ID, channel ID, staff ID (optional), customer ID (optional), one or more product ID and promo-code, from other components. AO internally may publish application ID and applicant ID to coordinate activities between portlets specific to AO. This interceptor is used in the action chain to receive values published by other portlets. This interceptor allows data to be passed into Global State, as shown in FIG. 7.

In some embodiments, the FE is a Portal application written against the R2DS for Java Framework. Presentation layer (UI) components may be written, for example, using Java.

In certain embodiments, a visual editor is provided that allows the UI designer to define the journey with steps, actions and branches. The tool will generate an XML configuration file that is used by the front portlet during runtime.

In preferred embodiments, the flow configuration is implemented with an XML structure as follows. Flows are defined as sequences of steps. Actions are exposed on the steps that lead to the next step. A unit-step-name mapping is defined to identify which portlet provides support for these portlets.

Figure 8:
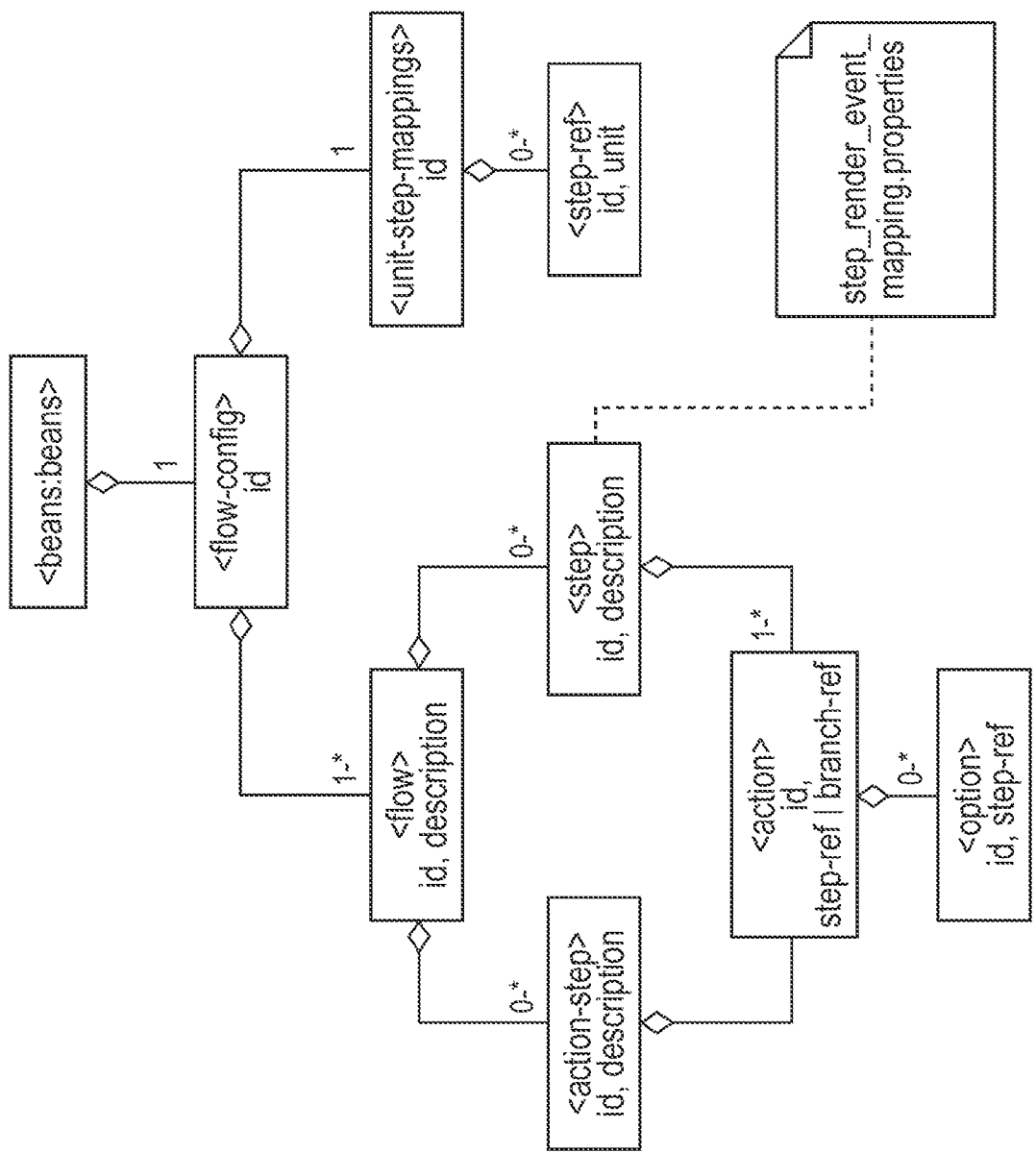
FIG. 8 shows an exemplary Flow Configuration XML Model.

FIG. 8 and Table 1 describe a flow configuration XML model according to some embodiments.

TABLE 1

| XML element | Description |
| --- | --- |
| <bean:beans> | Top level container that allows this configuration to be injected into Spring configuration |
| <flow-config> | Logical container for all the flow configuration data. "id" identifies the configuration node, not used otherwise in the system Contains 1 to many <flow> elements and a single <unit-step-mapping> element Flow Definition |
| <flow> | Defines a sequence of <step> and <action-step> that makes up the FE user journey. "id" is a unique key across all flows. At the start of AO process, an id will be passed from public web site (PWS) to indicate which flow to use for the AO application. This id stored in APe and it has a size limit of 10 vchar. "description" provide some readable information about the flow. This element contains a mixture of <action-step> and <step> sub-elements |
| <action-step> | Indicate of "faceless" step where services are invoked within the flow. "id" is unique across all types of steps; however the same step can repeat within a flow. This is stored in APe and it has a size limit of 10 vchar. "description" provide some readable information about the step. A single <action> sub-element is required |
| <step> | Indicate a screen display within the flow. "id" is unique across all types of steps; however the same step can repeat within a flow. This id is stored in APe and it has a size limit of 10 vchar. Each is mapped to an ES render event. This mapping is defined in the step_render_event_mapping.properties file. "description" provide some readable information about the step. Each step contains one or more <action> sub-element; each corresponds to a button or link on the screen. |
| <action> | Each action maps to an ES action event "id" maps the ES event id in the ES configuration "page-ref" is 1 of the 2 possible attributes, indicating which step to be displayed after the action. "branch-ref" is the $2^{nd}$ possible attribute, indicating branch logic should be evaluated. When there is a branch, then one or more <option> sub-element will be used to identify the possible output. |
| <option> | Identifies a possible output of a branch "id" is a logical name that describes the output "step-ref" identifies the target screen to be displayed for the output Unit Mapping |
| <unit-step-mappings> | A logical container of all the step mappings "id" identifies the configuration node, not used otherwise in the system |
| <step-ref> | Identify a single step and which portlet contains the step "id" of the given step "unit" is the name of a portlet in the system that is wired to support flow navigation |

A portlet that participates in the flow preferably includes a FlowNavigatorProcessor at the end of its action chain. In some embodiments, this processor performs two tasks: (1) determine what the next step is and, (2) if the next step is defined in another portlet, trigger appropriate wire to the target portlet.

Figure 9:
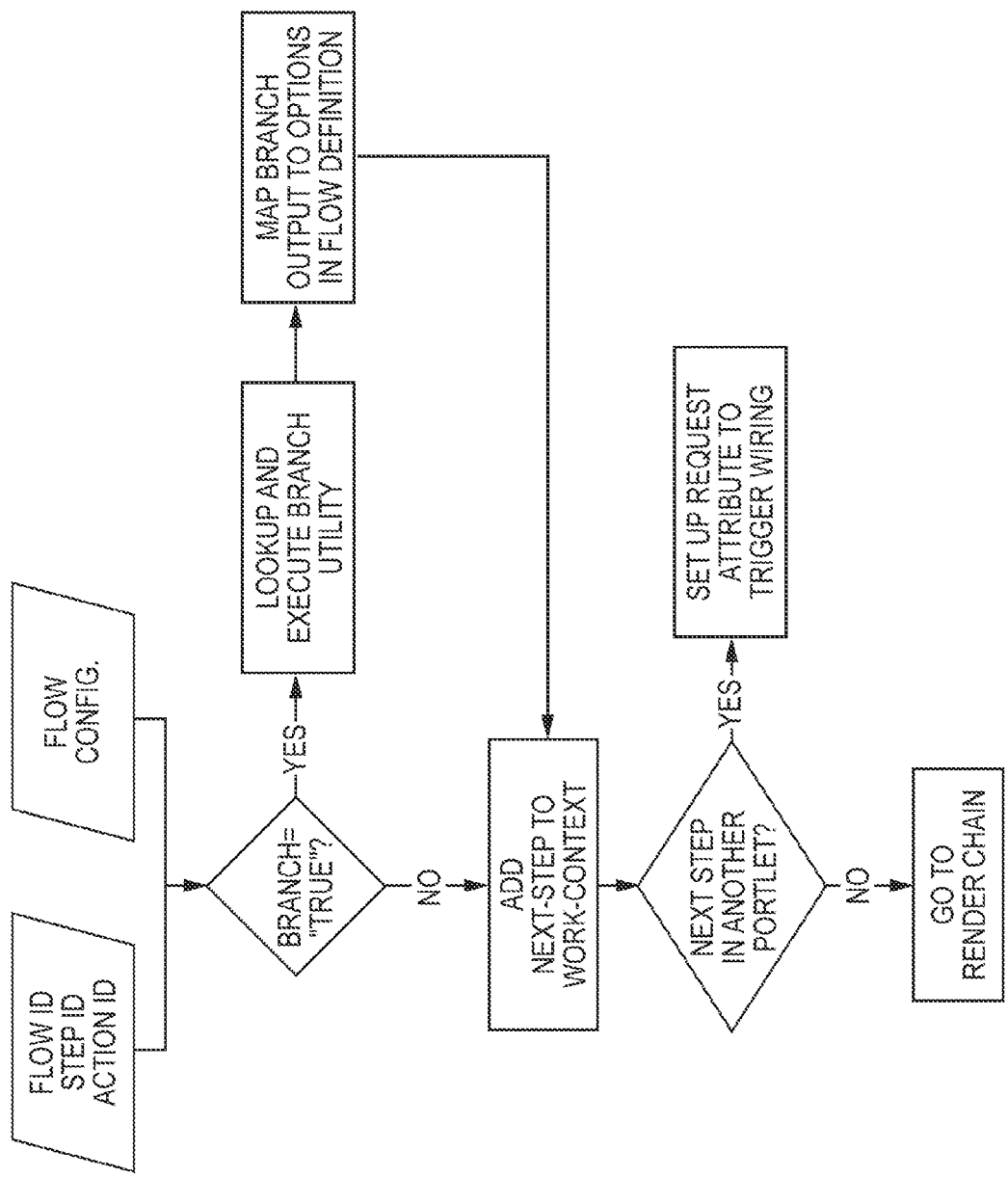
FIG. 9 shows an exemplary Logic to Resolving Next Step.

This processor may, for example, receive the flow ID, step ID, and action ID as the input and use this input to map to the definition in the flow configuration. In some embodiments, if a branch is defined, the processor will load the corresponding branch utility to resolve the next-step; otherwise, the next-step mapped directly to the action will be added to work-context. FIG. 9 shows an exemplary logic to resolving next step.

A branch utility is a simple Java class conforming to the simple interface described below. Preferably these are pre-built Java classes based on various business rules that are used in account opening, such as evaluating a service invocation result (e.g., application accepted or declined), evaluating input data that are relevant to the UI journey, etc. In some embodiments, these pre-built Java classes are isolated from other general rules, which are implemented in the processors or services, to allow a consolidated configuration for the UI journey.

Cooperative portlet (Wiring) is used to support the transition from one portlet to another. Once the next step is resolved, the flow navigator processor will use the step-mapping configuration to determine if the next step is defined in a different portlet or not. If it is, the flow navigator processor will set up appropriate request attribute to trigger the appropriate wire.

The present invention provides, in some embodiments, page flow across multiple portal pages. The Flow Configuration component provides the ability for custom orchestration of Front End screens, with each screen having a predefined set of actions and data blocks, to build a user flow. In some embodiments, certain changes (e.g., a change to the "Action Set" or "Number of data blocks" on a screen) may require IT involvement for the change.

Figure 10:
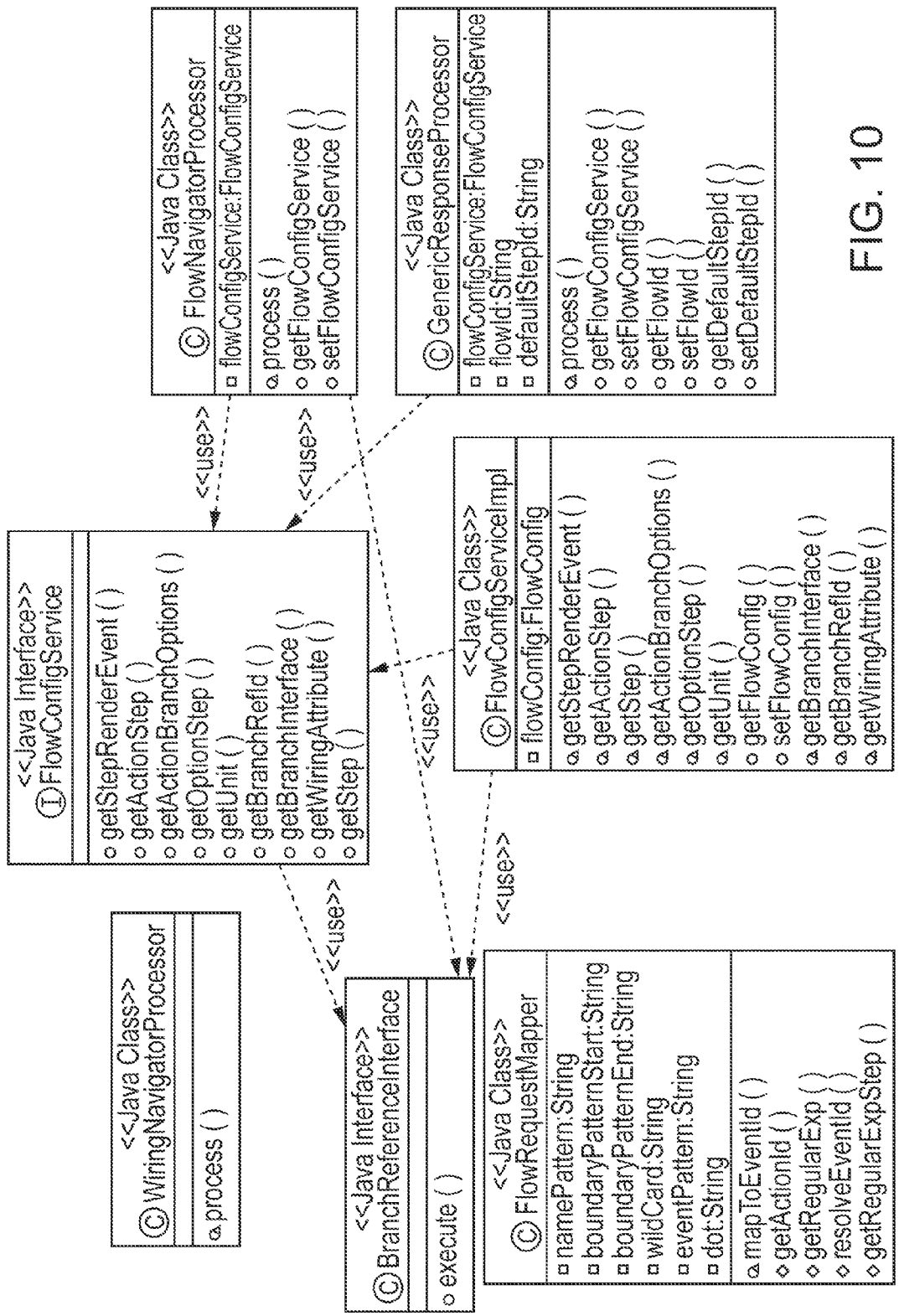
FIG. 10 illustrates exemplary components of a flow configuration, according to some embodiments.

Components: FIG. 10 is a class diagram showing exemplary components of a flow configuration, according to some embodiments. Descriptions of the components are as follows.

FlowNavigatorProcessor.java: This class is responsible for determining the next step (screen) for a particular action on a page. Based on current flow ID, step ID and action ID it grabs the next step from the flow-config.xml. This class is also responsible for invoking the wire if the current step and next step are not in the same portlet.

FlowConfigServiceImpl.java: This class used by the GenericResponseProcessor and FlowNavigatorProcessor to retrieve data from the flow-config.xml, portlet_screen_mapping_file.properties, and step_render_event_mapping.properties based on the request parameters.

BranchReferenceInterface.java: Interface to be implemented by custom navigation rule processors, to execute the business logic associated with a particular action and returns next option.

GenericResponseProcessor.java: This processor performs the following steps to identify the event ID based on the current step ID. (1) Retrieve the current step ID from session; (2) Invoke FlowConfigService.getStepRenderEvent with step ID as parameter to retrieve the event ID mapped to current step in step_render_event_mapping.properties; (3) Return the event ID.

WiringNavigatorProcessor.java: WiringNavigationProcessor is invoked for action events triggered by wire as part of inter-portlet communication. This processor gets the screen ID attribute from Request Attribute or Request Parameter scope and puts it in FlowConfigState and then control is passed to GenericResponseProcessor by returning the start_app as event ID.

FlowRequestMapper.java: This custom request mapper is injected into the action chain of each unit, to handle request action events triggered by user interaction. The steps are: (1) Resolve request to a event ID; (2) Extract action ID from the event ID. Action ID is identified by string between 'evt_' and next '_' in the event ID; (3) Add the action ID to request scope and return event ID.

flow_config.xml: Flow configuration set-up is described in detail in the Flow Configuration Utility section below. The XML in this file will be external to the portlet, but each development will have its own internal version for testing purposes.

step_render_event_mapping.properties: In some embodiments, each step will generally have an event mapped to it. This file provides that mapping. This file will be part of an externalized bundle. Example:
STEP__00001=evt_input_page
STEP__00002=evt_acknowedge_page
STEP__00003=evt_approval_page
STEP__00004=evt_approval2_page
STEP__00005=evt_input2_page
ACTN__00001=evt_input_page_choice portlet_screen_mapping_file.properties: When crossing portlets (units) an entry will be used via wiring to map the source attribute to the destination attribute, "Screen_id." This file provides that mapping. This file will be part of an externalized bundle. Example:
SampleApp=SampleAppScreenId
SampleApp2=SampleApp2ScreenId WSDL File: If Portlet to Portlet flow is needed then a Portlet Web Services Description Language (WSDL) file will be set up. This is described further in the Multi Portlet Flow and Wiring Steps sections below.

Figure 11:
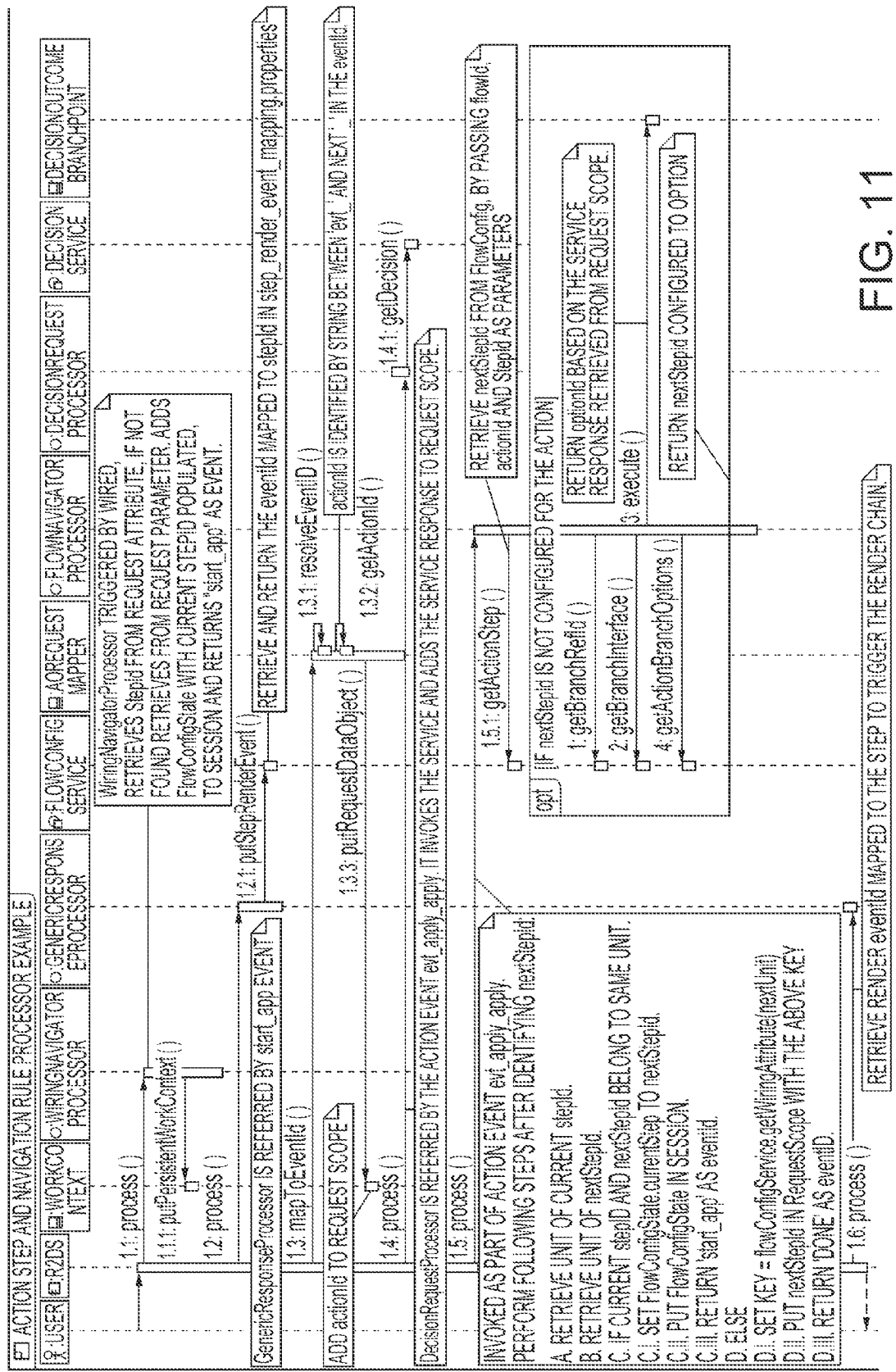
FIG. 11 is an exemplary Flow Configuration Sequence Diagram.

Sequence Diagram: FIG. 11 is an exemplary sequence diagram that provides details of how various components of Flow Configuration are related and when they would be invoked.

Menu Portlet Usage: The flow ID is passed into this component through a request parameter; while this can come from any source, the main supplier will be menu navigation links, which will pass this ID through.

Error Flow: Error flow will be handled by normal error trapping method using ES. The state of the flow will be reset if the portlet is restarted via the error page by triggering the portlet state reset mechanism, which is triggered by the blitz_token parameter.

Flow Configuration Utility

A user journey or flow is created using, for example, a flow configuration utility. A flow comprises a series of views called 'steps'. Entering a step typically results in a view being displayed to the user. On that view, user events occur that are handled by the step. These events can trigger transitions to other steps which result in view navigations.

Advantageously, in some embodiments, flows can be authored by application developers or business analysts using a simple XML-based flow definition language. The following steps describe the elements of this language.

Defining the user journey: Flows are defined and detailed in flow_config.xml. Theoretically any number of flows can be defined in this file. The flow configuration begins with the following root element:

```
<flow-config id="SampleApp">
</flow-config>
```

All flows are defined within this element. The root element will be part of the flow_config.xml file provided as part of component. This should not be changed during customization by regions.

Every flow begins with the flow tag as shown below:

```
<flow-config id="SampleApp">
    <flow id="FLOW__00001" description="Main Flow">
    </flow>
</flow-config>
```

All steps of the flow are defined within this element. The first step defined becomes the flow's starting point.

The step element is used to define a step of the flow that renders a view. An action element is used to handle events that occur within a state. These actions drive view navigations. The following shows the use of the step and action elements:

```
<flow-config id="SampleApp">
    <flow id="FLOW__00001" description="Main Flow">
        <step id="STEP__00001" description="payinputscreen">
            <action id="pay" step-ref="STEP__00002"/>
        </step>
    </flow>
</flow-config>
```

The above flow (FLOW__00001) comprises one step/screen (STEP__00001). This step supports the pay action which transitions to the next step (STEP__00002). The definition of the next step is not shown in the above flow. With the elements flow-config, flow, and step, the view navigation logic can be quickly expressed.

The following example shows the other step defined and a complete simple flow:

```
<flow id="FLOW__00001" description="Default Flow">
    <step id="STEP__00001" description="payinputscreen">
        <action id="pay" step-ref="STEP__00002"/>
```

```
        </step>
        <step id="STEP_00002" description="acknowledgescreen">
            <action id="back" step-ref="STEP_00001"/>
        </step>
    </flow>
```

The flow shows a simple movement from an input screen to an acknowledgment screen and back again. In some embodiments, there may be a character limit in APe for step ID and flow ID (e.g., 10 character limit).

Branching: The flow shown above is simplistic because it assumes that all steps in the flow are known upfront. However, in reality the next step in a transition may not be known upfront. The next screen may be dependent on the result of execution of business services of the application. For example, the next step in the flow may be determined based on some logic. To support this, the flow definition language provides support for branch classes.

A class that implements the interface BranchReferenceInterface.java is called a branch class. The interface is shown below:

```
package com.hsbc.group.common.flowconfig.pres;
import com.hsbc.esf.requestprocessing.WorkContext;
public interface BranchReferenceInterface {
    String execute(WorkContext workContext);
}
```

A branch class is used to evaluate data generated by business service operations that are invoked when the user initiates an action. The next step is based on one of multiple options returned by the branch class. The branch class returns one or more options. Each option is then mapped to a step in the flow configuration.

```
<flow-config id="SampleApp">
    <flow id="FLOW_00001" description="Default Flow">
        <step id="STEP_00001" description="payinputscreen">
            <action id="pay" step-ref="STEP_00002"/>
        </step>
        <step id="STEP_00002" description="acknowledgescreen">
            <action id="approve" branch-ref="approvalBranch">
                <option id="approvalone" step-ref="STEP_00003"/>
                <option id="approvaltwo" step-ref="STEP_00004"/>
            </action>
            <action id="back" step-ref="STEP_00001"/>
        </step>
        <step id="STEP_00003" description="approval1screen">
            <action id="back" step-ref="STEP_00001"/>
        </step>
        <step id="STEP_00004" description="approval2screen">
            <action id="back" step-ref="STEP_00001"/>
        </step>
    </flow>
</flow-config>
```

In the flow configuration above, the 'Acknowledgment Screen' (STEP_00002) is followed by the 'Approval Screen'. The business requirement says, for example, that if the payment amount is 500 or above then a higher approval amount screen is used. A branch class decides whether the Lower or Higher Approval Screen should follow the 'Acknowledgment Screen'.

A branch is specified in the flow configuration using the branch-ref attribute of the action tag. As shown above the 'approve' action of STEP_00002 refers to the ID of the branch class configured as a bean. The action tag includes option elements. Since the branch class in our example returns one of two values, 'approvalone' or 'approvaltwo', there are two option elements configured. The ID of the first option element is 'approvalone' and the ID of the second element is 'approvaltwo.'

An option element is configured for each unique value returned by the branch class and the ID of the option element is preferably the same as that of value returned by the branch.

Each option is mapped to a specific step using the step-ref attribute of the option element.

When the approve action is performed by the user on the 'Acknowledgment Screen' (STEP_00002), the class specified in the branch-ref attribute will be executed. Based on the data available to the branch class, it will return one of two values. The flow configuration will try to match the returned value with the IDs of the all the options defined. When a match occurs, the corresponding step will be displayed to the user.

The following shows the branch class used to evaluate the above.

```
package com.hsbc.group.common.flowconfig.sa.pres.processors;
import com.hsbc.esf.requestprocessing.WorkContext;
import com.hsbc.group.common.flowconfig.pres.services.BranchReferenceInterface;
public class ApprovalBranchReference implements BranchReferenceInterface {
    private final static String
        APPROVAL_PAGE_LOWER_AMOUNT = "approvalone";
    private final static String
        APPROVAL_PAGE_HIGHER_AMOUNT = "approvaltwo";
    public String execute(final WorkContext workContext) {
        String approvalPage = "";
        PaymentInformation paymentInfo = (PaymentInformation) workContext
                .getUserData("paymentinformation");
        if (paymentInfo.getAmount() < 500) {
            approvalPage =
ApprovalBranchReference.APPROVAL_PAGE_LOWER_AMOUNT;
        } else {
            approvalPage =
ApprovalBranchReference.APPROVAL_PAGE_HIGHER_AMOUNT;
        }
        return approvalPage;
    }
}
```

As is evident, the decision on whether the higher or lower approval page is based on the payment amount data element present in session. Also, the branch class returns one of two options—approvalone or approvaltwo—every time it executes.

The out of the box implementation for each product provides a set of branch classes and the data needed by these classes are made available to them through the WorkContext object. During regional implementations, if additional branch classes are required, changes may be necessary to the application's core classes to ensure that the data needed by the new branch class(es) are available to them.

In some embodiments, this class is configured as a spring bean in the relevant configuration file as shown below:

```
<bean id="approvalBranch" class="
com.hsbc.group.common.flowconfig.sa.portlet.processing.ApprovalBranchReference"/>
```

Action Step: In some embodiments, applications are multi-portlet, and each portlet is packaged as a separate WAR.

During the course of a journey, the user navigates from one portlet to another. Usually, the source portlet specifies the next step in the target portlet. However, in certain cases, the initial screen of the target portlet may not be known upfront.

The Product Configuration portlet is a case in point. After the Gather Applicant Details portlet, the next portlet in the journey is the Product Configuration portlet. Here, the first screen depends on whether the user has selected a single product or multiple products. In a single product scenario, the user is shown a screen with the decision details, terms and conditions (T&C), and product configuration options. For a multiple product scenario, the user is shown a screen with the decision details for each product.

In the example app, there are two different pay-input screens based on a decision made with the action-step branch.

The flow definition language provides the action-step element for scenarios where the initial screen of a portlet is determined at runtime. The following example shows the usage of an action step.

```
<flow-config id="SampleApp">
    <flow id="FLOW_00001" description="Default Flow">
        <action-step id="ACTN_00001" description="Action to goto correct Pay Page">
            <action id="ACTN_00001" branch-ref="payBranch">
                <option id="inputlow" step-ref="STEP_00001"/>
                <option id="inputhigh" step-ref="STEP_00005"/>
            </action>
        </action-step>
        <step id="STEP_00001" description="payinputscreen">
            <action id="pay" step-ref="STEP_00002"/>
            <action id="approve" branch-ref="approvalBranch">
                <option id="approvalone" step-ref="STEP_00003"/>
                <option id="approvaltwo" step-ref="STEP_00004"/>
            </action>
        </step>
        <step id="STEP_00002" description="actknowledgescreen">
            <action id="approve" branch-ref="approvalBranch">
                <option id="approvalone" step-ref="STEP_00003"/>
                <option id="approvaltwo" step-ref="STEP_00004"/>
            </action>
            <action id="back" step-ref="ACTN_00001"/>
        </step>
        <step id="STEP_00003" description="approval1screen">
            <action id="back" step-ref="ACTN_00001"/>
        </step>
        <step id="STEP_00004" description="approval2screen">
            <action id="back" step-ref="ACTN_00001"/>
        </step>
        <step id="STEP_00005" description="payinput2screen">
            <action id="pay" step-ref="STEP_00002"/>
            <action id="approve" branch-ref="approvalBranch">
                <option id="approvalone" step-ref="STEP_00003"/>
                <option id="approvaltwo" step-ref="STEP_00004"/>
            </action>
        </step>
    </flow>
</flow-config>
```

The 'back' action on previous steps was previously configured as follows:

```
<step id="STEP_00003" description="approval1screen">
    <action id="back" step-ref="STEP_00001"/>
</step>
```

With the introduction of the action-step, it is configured differently:

```
<step id="STEP_00003" description="approval1screen">
    <action id="back" step-ref="ACTN_00001"/>
</step>
```

The 'Approval1Screen' now passes control to the action-step.

The action-step defines an action which is handled by a branch class. The action within an action-step includes a branch-ref attribute set to a branch class reference. This is clear because an action-step is necessary to evaluate some condition and, as previously discussed, the way to do that in the flow configuration is via a branch class.

Mapping to an ES Event: The step ID and the action ID combined are mapped to an event defined in the ES configuration. This is an important point because, while the flow configuration is abstracted into a simpler format, it is tightly coupled to the underlying processing that is configured using ES. A person must understand what data is captured on the screen and what business logic should be executed and ensure that they are configured properly. For a particular step, the action ID is retrieved from the event fired by the user. The following pattern is followed when defining the event for an action:

cmd_actionID_*

The FlowRequestMapper.java is responsible to retrieve the action from the event and put it in the session scope for later use. In the following (e.g., select_product_information_data.jsp) there is a button called "Go" which triggers an event "cmd_apply_capturepersonaldetails" when clicked. In this case the action is "apply".

```
<jhx:actionButton event="cmd_apply_capturepersonaldetails"
    label="#{labelsPI.GO}"></jhx:actionButton>"
```

Figure 12:
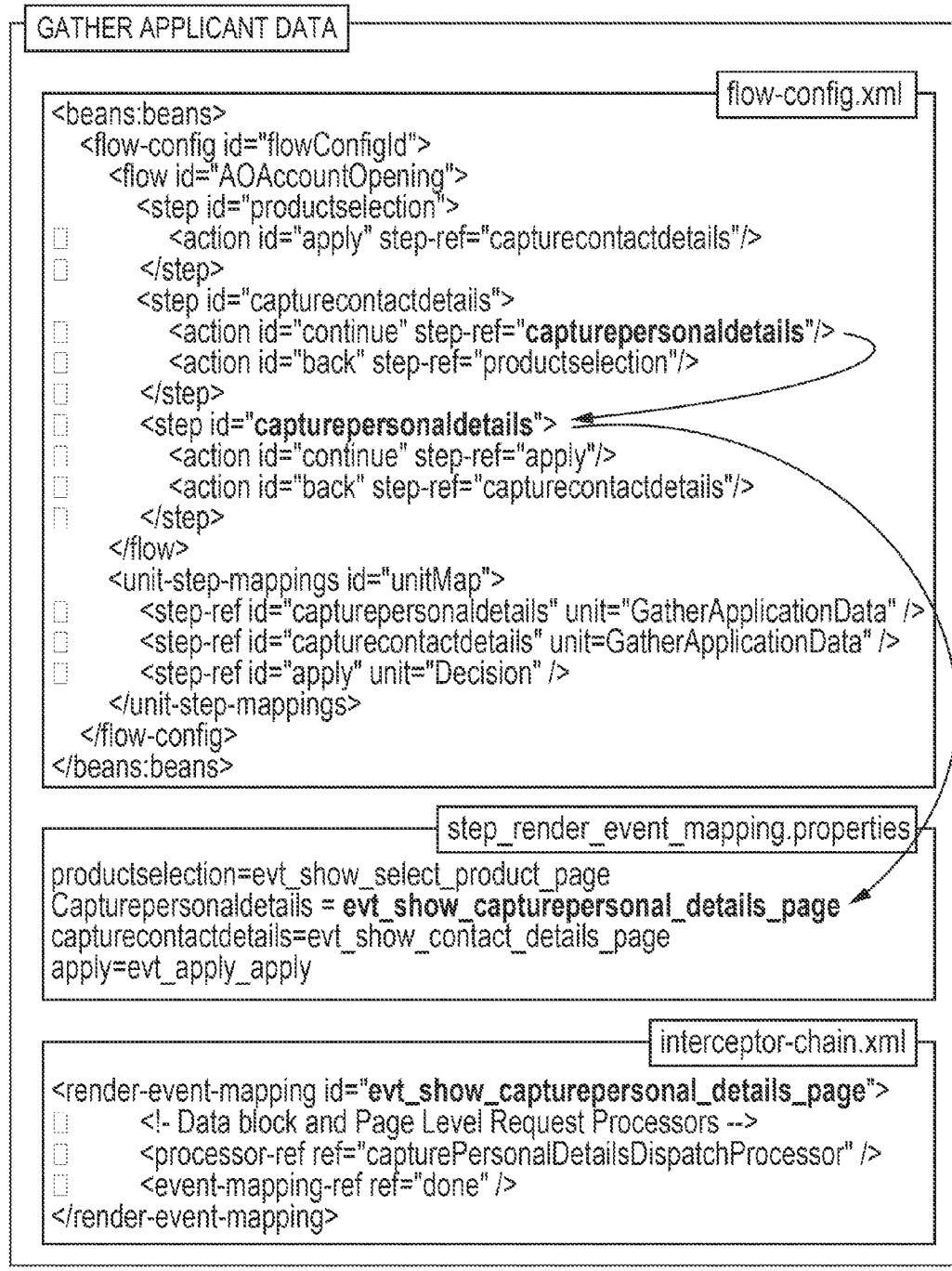
FIG. 12 is an exemplary diagram Mapping a Step in Flow Configuration to an Executions Services (ES) Event, according to some embodiments.

FIG. 12 is a diagram showing an example of how a step in Flow Configuration maps to an ES Event. The FlowNavigatorProcessor grabs the action from the session (which was stored by the FlowRequestMapper) and decides the next step.

Multi-Portlet Flow: The description above describes flows that just span a single Portlet, but the flow component of the present invention also allows users to cross Portlets as part of their user journey.

Cooperative portlet (Wiring) is used to support the transition from one portlet to another. Each portlet will declare a WSDL, similar to the following example, as a target portlet.

A portlet that navigates to another portlet declares a WSDL as a source portlet. In some embodiments, this portlet also requires the navigation processor to trigger the screen transition from one portlet to the other. The Wiring Steps section below provides exemplary WSDL and Wiring details to be configured for wiring different portlets/units using the Flow Config.

Figure 13:
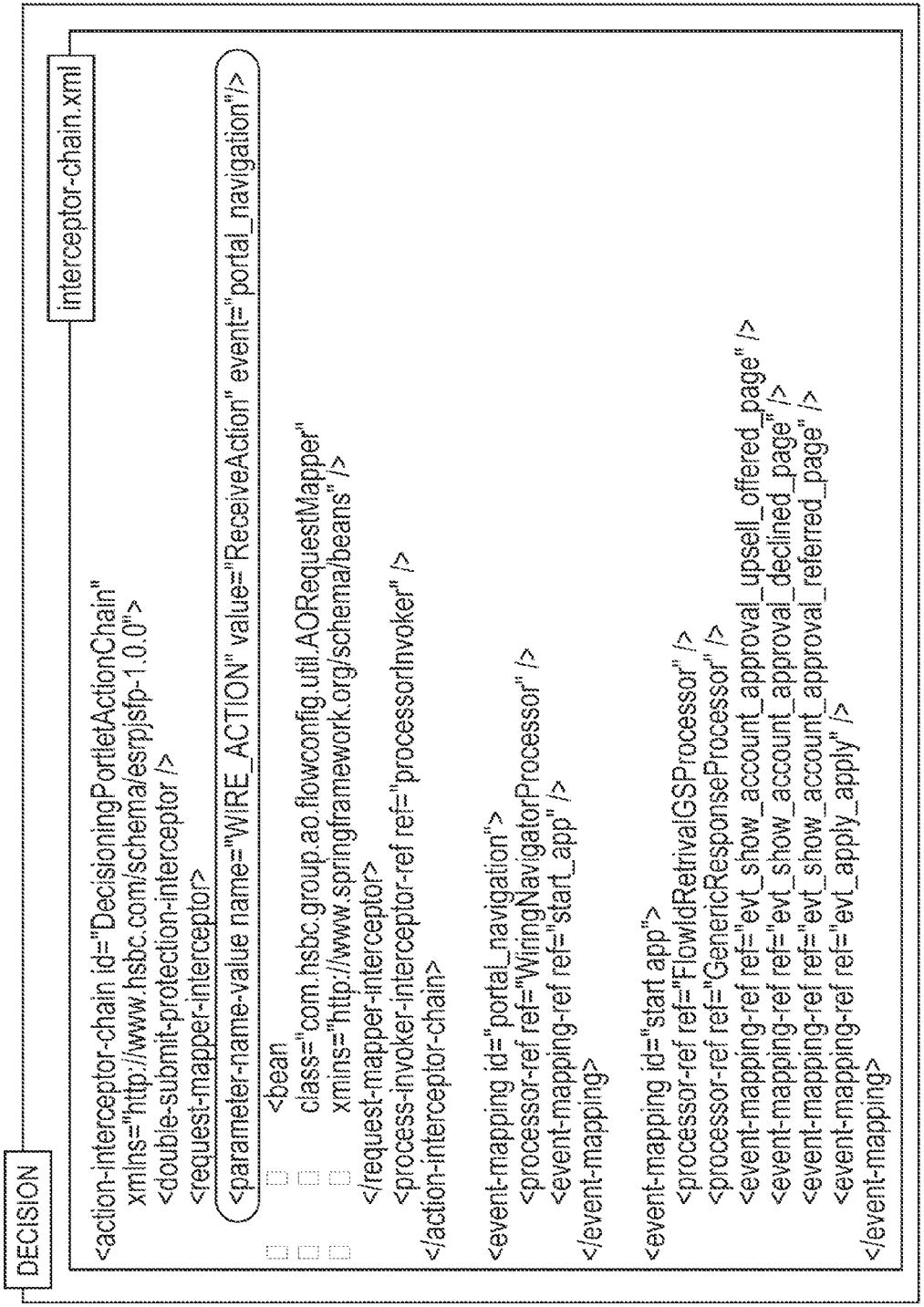
FIG. 13 shows an exemplary Portlet Wiring Configuration specific to Flow Configuration.

In addition to the steps provided in the Wiring Steps section below, the WiringNavigatorProcessor should be configured under the action interceptor chain of target Portlets. This enables the WiringNavigatorProcessor to receive the requests triggered by wire. FIG. 13 shows an exemplary portlet wiring configuration specific to Flow Config.

Figure 14:
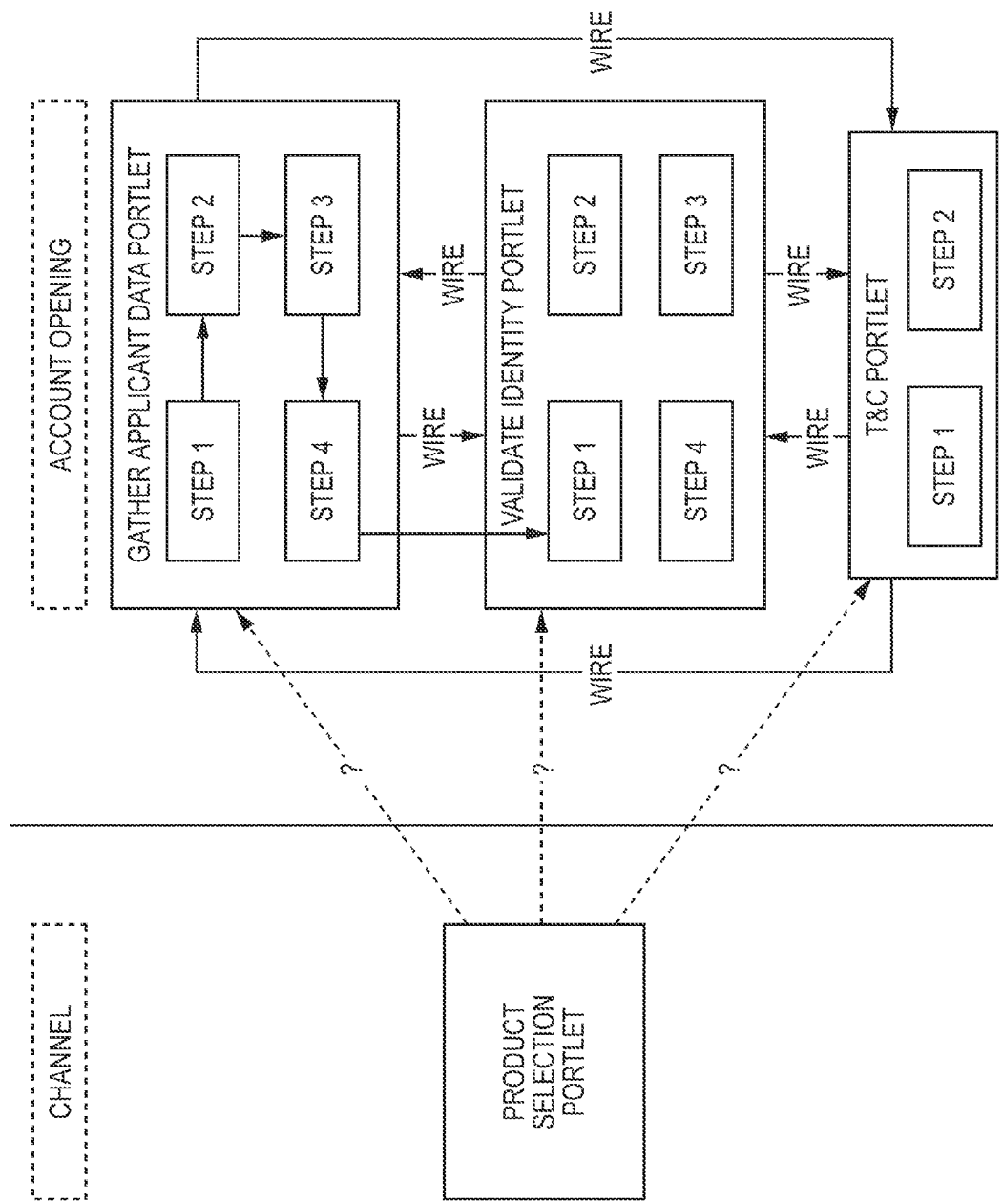
FIG. 14 is a exemplary diagram of Communication between Portlets.
Figure 15:
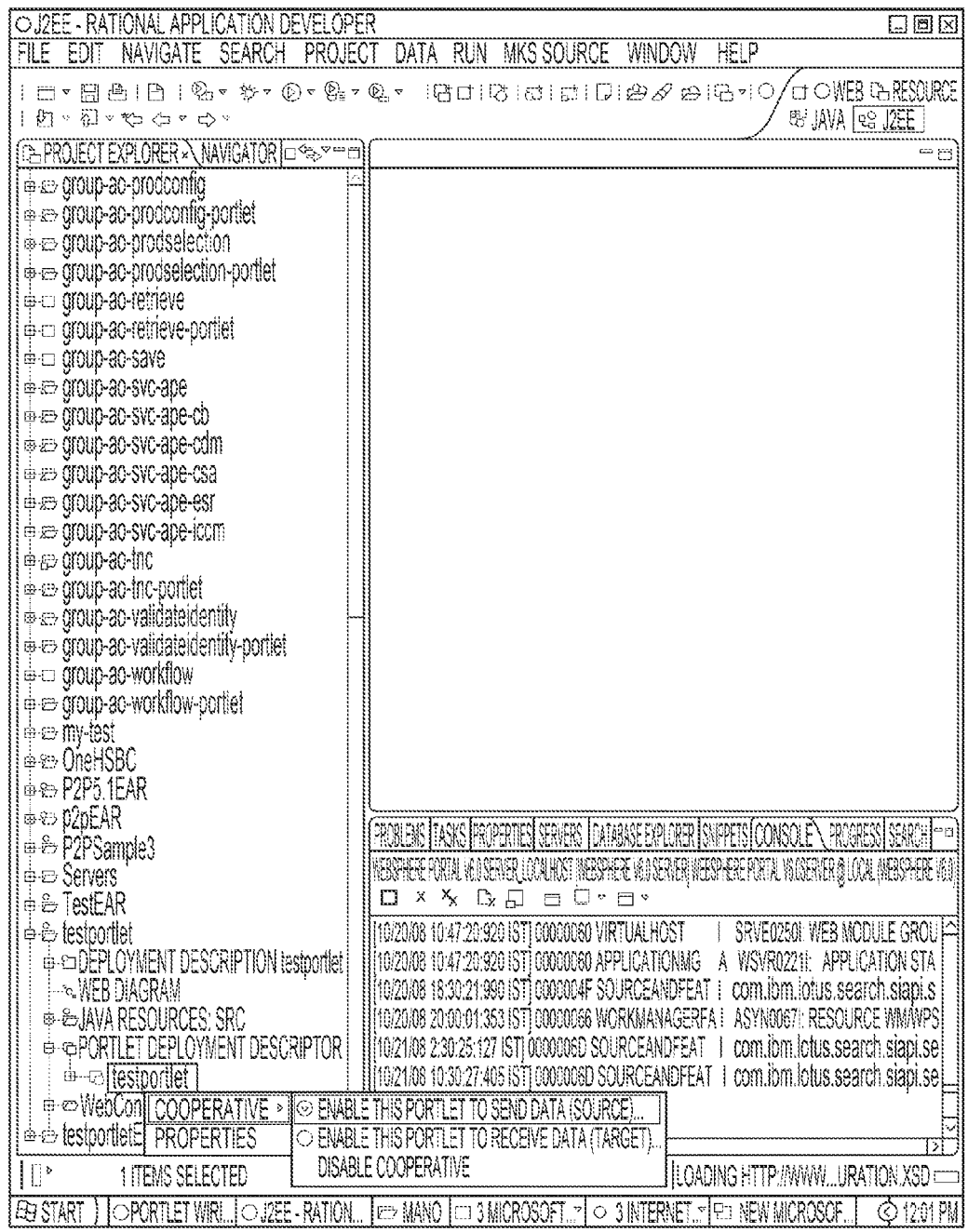

FIG. 14 is a exemplary diagram of communication between portlets. In FIG. 14, there is the Product Selection Portlet on the channel side and three portlets—Gather Applicant Data, Validate Identity and T&C—on the account opening side. As shown in FIG. 14, all portlets within account opening may be wired to each other. This provides the flexibility to move from a portlet to any other portlet within account opening. The initiating portlet will send the flow ID and step ID as wired parameters to the target portlet. The target portlet will use the parameters to display the relevant screen (step) to the user. Screen (Step) navigation within a portlet will be handled using the flow configuration as described above.

Configuration of this is done via a section at the bottom of the flow called the unit-step-mappings element.

Below is an extract from the sample app, that shows that all our steps are in the same Portlet(Unit):

```
<!-- Screen to Portlet Mappings -->
<unit-step-mappings id="unitMap">
    <step-ref id="STEP_00001" unit="sampleApp"/>
    <step-ref id="STEP_00002" unit="sampleApp"/>
    <step-ref id="ACTN_00001" unit="sampleApp"/>
    <step-ref id="STEP_00003" unit="sampleApp"/>
    <step-ref id="STEP_00004" unit="sampleApp"/>
    <step-ref id="STEP_00005" unit="sampleApp"/>
<!-- Screen to Portlet Mappings -->
</unit-step-mappings>
```

However if, for example, STEP_0002 was in a different Portlet/Unit, it would have a different unit name that any others:

```
<!-- Screen to Portlet Mappings -->
<unit-step-mappings id="unitMap">
    <step-ref id="STEP_00001" unit="sampleApp"/>
    <step-ref id="STEP_00002" unit="sampleApp"/>
    <step-ref id="ACTN_00001" unit="sampleApp"/>
    <step-ref id="STEP_00003" unit="anotherApp"/>
    <step-ref id="STEP_00004" unit="sampleApp"/>
    <step-ref id="STEP_00005" unit="sampleApp"/>
<!-- Screen to Portlet Mappings -->
</unit-step-mappings>
```

The FlowController class checks to see if the next STEP belongs to another unit, and if so it will create a request parameter that will be externalized in a file called portlet_screen_mapping_file.properties. This file will hold a key value pair of the unit name and the key to be used for the request parameter. Example:

anotherApp=anotherAppScreenId

In this parameter a map of data is stored, currently holding a key called Screen_Id, which holds a reference to the next-StepID; in the above case this will be "STEP_00003"

Then using wires the anotherAppScreenId attribute can be mapped to another portlet with the destination attribute of Screen_Id. The destination Portlet will look for WIRE_ACTION, and if found ends up in the WiringNavigation Processor, which will get the map that was put on the wire, read the information in the map (e.g., the StepID), and use that information to populate the flow State object.

The flowID is currently passed through as a request parameter from the consumer as parameter HSBC_OHD_FLOW_ID. In alternative embodiments, this may be held in global state to allow multi-portlet stepping.

Edit_defaults Config Mode: When using different modes than view, simple R2ds request processing can be used. A separate event and command prefix are used to bypass the flow request mapper. See below for an example using stdCmd and stdEvt instead of cmd and evt.

```
<!-- ******* STANDARD ACTION EVENTS ******** -->
<event-mapping id="stdEvt_set_default_data">
    <processor-ref ref="SetDefaultsRequestProcessor" />
    <render-event-mapping id="success">
        <processor-ref ref="SetDefaultsResponseProcessor" />
        <event-mapping-ref ref="done" />
    </render-event-mapping>
</event-mapping>
<!-- ******* STANDARD RENDER EVENTS ******** -->
<render-event-mapping id="stdEvt_edit_defaults_page">
    <processor-ref ref="SetDefaultsResponseProcessor" />
    <event-mapping-ref ref="done" />
</render-event-mapping>
...
</event-mappings>
</process-invoker-interceptor>
<action-interceptor-chain id="actionchain">
    <double-submit-protection-interceptor />
    <request-mapper-interceptor>
        <parameter-name-value name="WIRE_ACTION" value="ReceiveAction" event="portal_navigation" />
        <parameter-name name="stdCmd_*" event="stdEVt_*" />
        <beans:bean class="com.hsbc.group.flowconfig.pres.FlowRequestMapper" />
    </request-mapper-interceptor>
    <process-invoker-interceptor-ref ref="processorInvoker" />
</action-interceptor-chain>
<render-interceptor-chain id="renderchain">
    ...
    <portlet-mode-mapper-interceptor>
        <mode-default-event mode="view" event="start_app" />
        <mode-default-event mode="edit_defaults" event="stdEvt_edit_defaults_page" />
    </portlet-mode-mapper-interceptor>
    <process-invoker-interceptor-ref ref="processorInvoker" />
</render-interceptor-chain>
```

Cascading Wires

In some embodiments, flow will handle cascading wires automatically. Preferably, the following steps are performed for cascading wires.

(1) Ensure that the start_app event is a regular event not a render event. This allows flow to trigger another wire in the same action chain.

(2) Ensure that the cascading wire setup is in the WSDL. Two output wires for every output target are used in some embodiments, one as an output message on the input event and one as a regular output wire. See the Component Configuration section below, which contains a sample WSDL.

(3) Set up the flow configuration as follows. In this example when step OHTS_A001 is loaded it will trigger a wire to OHTS_0004 immediately. It will also load the page in its own view for OHTS_0002. See the ##ohd training flow project for examples.

```
<step id="OHTS_A001" description="Action Step">
    <action id="portal_navigation" step-ref="OHTS_0004"/>
    <action id="send_wire" step-ref="OHTS_0002"/>
</step>
```

Alternative Features

In various embodiments, the invention may include one or more of the following features: package structure com.hsbc.flowconfig.pres; OH Pom.xml file; services.impl package having all branch classes specific to an application deleted; removed use of Spring Application Context and injected items where required using spring; Flow data are passed on the Wire: Flow context scope to hold and pass flow scoped data; flow input interceptor added so flow data may be read from the unencoded request parameter scope; branch classes used as Processors and/or service type classes.

Component Configuration

This section focuses on the configuration required for the component.

Naming Standards: In some embodiments, the following naming standards are used.

Base Standards:
Product Identifier
PA Payments
AO Account Opening
SE Servicing
SC Staff Channel
CC Customer Channel
OH Global
Flow ID
Ten characters long
Alpha Numeric plus_
Step ID
Ten characters long
Alpha Numeric plus_
Local Portlet Standards:

```
Flow ID
    <2 Character Product Identifier><2 Character Component
    Identifier>F<5 Alpha Numeric
    plus __
    characters>
    e.g., PAADF__1234
Step ID
    <2 Character Product Identifier><2 Character Component
    Identifier>F<5 Alpha Numeric
    plus __
    characters>
    e.g., PAADS__0101
```

WAR Portlet Standards:

```
Flow ID
    <2 Character Product Identifier><2 Character Component
    Identifier>F<5 Alpha Numeric
    plus __
    characters>
    e.g. PAF__123456, OHF__123456
Step ID
    <2 Character Product Identifier><2 Character Component
    Identifier>F<5 Alpha Numeric
    plus __
    characters>
    e.g. PAS__010101, OHS__010101
```

Installation and Deployment: In some embodiments, for installation and deployment, the following steps are performed.

(1) Add the following POM entry to the project.

```
<dependency>
    <groupId>com.hsbc.group.flowconfig</groupId>
    <artifactId>group-flowconfig-pres</artifactId>
</dependency>
```

(2) Add the following entry to the dependency management section of the parent POM. Ensure the version number is the correct version.

```
<dependency>
    <groupId>com.hsbc.group.flowconfig</groupId>
    <artifactId>group-flowconfig-pres</artifactId>
    <version>y.x.z</version>
</dependency>
```

Portlet Configuration: Preferably, the following steps are performed for portlet configuration:

(1) Include the following lines in the portlet config.

```
<import resource="classpath:/group/ohdtraining/flowcontrol/<Portlet Name>/flow/beans.xml"/>
<import resource="classpath:/group/flowconfig/flow-service.xml"/>
```

(2) Define the flow/beans.xml defining the following four beans (defaultFlowId, defaultFlowStepId, StepRenderEventMappings, unit WiringScreenIdMappings).

```
<!-- FLOW BEANS -->
<bean id="defaultFlowId" class="java.lang.String" >
    <constructor-arg value="OHTF__P123"/>
</bean>
<bean id="defaultFlowStepId" class="java.lang.String" >
    <constructor-arg value="OHTS__P001"/>
</bean>
<!-- MAPPING SOURCES -->
<bean id="stepRenderEventMappings"
class="org.springframework.context.support.ResourceBundleMessageSource
">
    <property name="basenames">
        <list>
<value>group.flow.step__render__event__mapping</value>
<value>group.<product
code>.common.flow.step__render__event__mapping</value>
<value>group.<product code>.<component code>.<Portlet
Name>.flow.step__render__event__mapping</value>
        </list>
    </property>
</bean>
<bean id="unitWiringScreenIdMappings"
class="org.springframework.context.support.ResourceBundleMessageSource
">
    <property name="basenames">
        <list>
```

```
    <value>group.flow.portlet_screen_mapping_file</value>
    <value>group.<product
code>.common.flow.portlet_screen_mapping_file</value>
    <value>group.<product code>.<component code>.<Portlet
Name>.flow.portlet_screen_mapping_file</value>
        </list>
      </property>
    </bean>
```

(3) Define the actions steps (flow/action-steps.xml) and the flow steps (flow/render-steps.xml).

(4) Add configuration to the interceptor-chain.xml for WireNavigatorProcessor, GenericResponseProcessor, InputFlowInterceptor, FlowRequestMapper and the standard Wire Action ReceiveAction.

```
<process-invoker-interceptor id="processorInvoker"
  xmlns="http://www.hsbc.com/schema/esrpjsfp-1.0.0">
    <event-mappings>
      <!-- ******* FLOW ACTION EVENTS ******** -->
      <event-mapping id="portal_navigation">
        <processor-ref ref="WiringNavigatorProcessor" />
        <event-mapping-ref ref="start_app" />
      </event-mapping>
      <include resource="flow/action-steps.xml" />
      <!-- ******* FLOW RENDER EVENTS ******** -->
      <event-mapping id="start_app">
        <processor-ref ref="GenericResponseProcessor" />
        <event-mapping-ref ref="evt_render_step1" />
        <event-mapping-ref ref="evt_render_step2" />
        <event-mapping-ref ref="evt_render_step3" />
      </event-mapping>
      <include resource="flow/render-steps.xml" />
    </event-mappings>
</process-invoker-interceptor>
<action-interceptor-chain id="actionchain"
  xmlns="http://www.hsbc.com/schema/esrpjsfp-1.0.0">
    <double-submit-protection-interceptor />
    <request-mapper-interceptor>
      <parameter-name-value name="WIRE_ACTION"
value="ReceiveAction" event="portal_navigation" />
```

```
      <parameter-name name="stdCmd_*" event="stdEvt_*" />
      <beans:bean
class="com.hsbc.group.flowconfig.pres.FlowRequestMapper" />
    </request-mapper-interceptor>
    <process-invoker-interceptor-ref
ref="processorInvoker" />
  </action-interceptor-chain>
  <render-interceptor-chain id="renderchain"
  xmlns="http://www.hsbc.com/schema/esrpjsfp-1.0.0">
  ...
    <beans:bean
class="com.hsbc.group.flowconfig.pres.FlowInputInterceptor">
      <beans:property name="optionalInputKeys"
ref="flowDataFields"/>
    </beans:bean>
    <portlet-mode-mapper-interceptor>
      <mode-default-event mode="view"
event="start_app" />
      <mode-default-event mode="edit_defaults"
event="stdEvt_init_edit_defaults_page" />
    </portlet-mode-mapper-interceptor>
    <process-invoker-interceptor-ref
ref="processorInvoker" />
  </render-interceptor-chain>
</beans>
```

(5) Create Default Wiring WSDL using default wiring target. In some embodiments, only elements below in bold are changed per portlet. Everything else should be the same. For the elements in bold there would be one entry per possible output target.

```
<?xml version="1.0" encoding="UTF-8"?>
<definitions xmlns=http://schemas.xmlsoap.org/wsdl/
  xmlns:portlet="http://www.ibm.com/wps/c2a" xmlns:tns=http://OHD/
  name="FlowConfig_Service" targetNamespace="http://OHD/">
  <!-- Declare datatypes. One per portlet. -->
  <types>
    <xsd:schema xmlns:xsd="http://www.w3.org/2001/XMLSchema"
      targetNamespace="http://OHD/">
      <xsd:complexType name="FlowNavigation_Type"/>
    </xsd:schema>
  </types>
  <!-- These are messages coming in to this portlet.
    Should just be one input message for flow. -->
  <message name="FlowConfig_Request">
    <part name="FlowConfig_Input"
type="tns:FlowNavigation_Type" />
  </message>
  <!-- These are messages coming out of this portlet.
    - Will be many outputs for flow, one for each potential
target.
    - For each output you need to declare a regular output
and a cascade output.
    - You should also include the default input output parts
-->
  <message name="FlowConfig_Response">
    <part name="FlowConfig_Output"
type="tns:FlowNavigation_Type"/>
    <part name="<output target 1>_Output"
type="tns:FlowNavigation_Type"/>
  ...
```

```
                <part name="<output target N>_Output"
type="tns:FlowNavigation_Type"/>
    </message>
        <message name="FlowConfigBasic_Response">
            <part name="FlowConfigBasic_Output"
type="tns:FlowNavigation_Type"/>
            <part name="<output target 1>-Cascade_Output"
type="tns:FlowNavigation_Type"/>
            <part name="<output target N>-Cascade_Output"
type="tns:FlowNavigation_Type"/>
    </message>
        <!-- Declare service for this portlet. -->
    <portType name="FlowConfig_Service">
        <!-- Declare the input operation for this portlet. -->
            <operation name="FlowConfig_Input_Operation">
                <input message="tns:FlowConfig_Request"/>
                <output message="tns:FlowConfigBasic_Response"/>
            </operation>
            <!-- Declare the output operation for this portlet. -->
            <operation name="FlowConfig_Output_Operation">
                <output message="tns:FlowConfig_Response"/>
            </operation>
    </portType>
    <!-- Declare the bindings for this portlet. -->
        <binding name="FlowConfig_Binding"
type="tns:FlowConfig_Service">
        <portlet:binding/>
        <!-- Bind the input operations for this portlet. -->
          <operation name="FlowConfig_Input_Operation">
                <!-- The input action parameter is used in request
mapping to trigger the start app. -->
                <portlet:action actionNameParameter="WIRE_ACTION"
caption="Action.<portlet name>.Receiving" name="ReceiveAction"
type="standard"/>
            <input>
                <portlet:param boundTo="request-attribute"
caption="Property.To.<portlet name>" class="java.util.Map"
name="ScreenId" partname="FlowConfig_Input"/>
            </input>
            <output>
                <portlet:param boundTo="request-attribute"
caption="Property.FlowConfig.GenericExit.Cascade"
class="java.util.Map" name="generic-screenid-cascade"
partname="FlowConfigBasic_Output"/>
                <portlet:param boundTo="request-attribute"
caption="Property.<portlet name>.To.<output target 1>.Cascade"
class="java.util.Map" name="<output target 1>-screenid-cascade "
partname="<output target 1>-Cascade_Output"/>
                   ...
                <portlet:param boundTo="request-
attribute" caption="Property.<portlet name>.To.<output target
N>.Cascade" class="java.util.Map" name="<output target N>-
screenid-cascade" partname="<output target N>-Cascade_Output"/>
            </output>
        </operation>
        <!-- Bind the output operations for this portlet. -->
        <operation name="FlowConfig_Output_Operation">
                <!-- The output action is triggered when the following
parameter is in the request. -->
                <portlet:action actionNameParameter="WIRE_ACTION"
caption="Action.<portlet name>.Sending" name="SendAction"
type="standard"/>
            <output>
                <portlet:param boundTo="request-attribute"
caption="Property.FlowConfig.GenericExit" class="java.util.Map"
name="generic-screenid" partname="FlowConfig_Output"/>
                <portlet:param boundTo="request-attribute"
caption="Property.<portlet name>.To.<output target 1>"
class="java.util.Map" name="<output target 1>-screenid"
partname="<output target 1>_Output"/>
                   ...
                <portlet:param boundTo="request-
attribute" caption="Property.<portlet name>.To.<output target N>"
class="java.util.Map" name="<output target N>-screenid"
partname="<output target N>_Output"/>
            </output>
        </operation>
```

```
    </binding>
</definitions>
```

The last two <portlet:param sections in italics above are for multiple portlet cases where branching between different possible target pages is supported. For each possible target page another entry is used with a different screen ID. The screen ID maps to the unit in flow config via the portlet screen mapping file discussed in more detail below.

If local portlet specific flows are defined then the following portlet configuration steps may be optionally performed.

(1) Add flow config import to portlet.

```
<import
resource="classpath:/group/ohdtraining/flowcontrol/singleportlet/f
low/flow-config.xml"/>
```

(2) Create flow config that defines the flows. Example flow-config.xml:

```
<?xml version="1.0" encoding="UTF-8"?>
<beans:beans xmlns="http://www.hsbc.com/schema/sfp-1.0.0"
    xmlns:xsi="http://www.w3.org/2001/XMLSchema-instance"
    xmlns:beans="http://www.springframework.org/schema/beans"
    xsi:schemaLocation="
        http://www.springframework.org/schema/beans
http://www.springframework.org/schema/beans/spring-beans-2.0.xsd
        http://www.hsbc.com/schema/sfp-1.0.0
http://www.hsbc.com/schema/sfp-1.0.0/flow-configuration.xsd">
    <flow-config
    id="OHDTRAINING_SINGLEPORTLET_FlowConfig"
xmlns="http://www.hsbc.com/schema/sfp-1.0.0">
        <flow id="OHTF_P123" description="Normal application flow">
            <step id="OHTS_P001" description="Step #1">
                <action id="first" step-ref="OHTS_P001"/>
                <action id="prev" step-ref="OHTS_P001"/>
                <action id="next" step-ref="OHTS_P002"/>
                <action id="last" step-ref="OHTS_P003"/>
            </step>
            <step id="OHTS_P002" description="Step #2">
                <action id="first" step-ref="OHTS_P001"/>
                <action id="prev" step-ref="OHTS_P001"/>
                <action id="next" step-ref="OHTS_P003"/>
                <action id="last" step-ref="OHTS_P003"/>
            </step>
            <step id="OHTS_P003" description="Step #3">
                <action id="first" step-ref="OHTS_P001"/>
                <action id="prev" step-ref="OHTS_P002"/>
                <action id="next" step-ref="OHTS_P003"/>
                <action id="last" step-ref="OHTS_P003"/>
            </step>
        </flow>
        <unit-step-mappings id="unitMap"
            <step-ref id="OHTS_P001" unit="ohdtraining-flowcontrol-singleportlet"/>
            <step-ref id="OHTS_P002" unit="ohdtraining-flowcontrol-singleportlet"/>
            <step-ref id="OHTS_P003" unit="ohdtraining-flowcontrol-singleportlet"/>
        </unit-step-mappings>
    </flow-config>
</beans:beans>
```

(3) Create step mapping. Example step_render_event_mapping.properties:
  OHTS_P001=evt_render_step1
  OHTS_P002=evt_render_step2
  OHTS_P003=evt_render_step3

(4) Create screen mapping. In the case of local flows the screen mapping will be very simple with just one line. Example portlet_screen_mapping_file.properties:
  ohdtraining-flowcontrol-singleportlet=singleportlet-screenid WAR Configuration: For WAR configuration, the following is preferred. Unless all portlets in the WAR have fully defined local portlet flows, the flow configuration for the portlets in the WAR need to be defined. The files that would be deployed to this directory are: flow-config.xml; portlet_screen_mapping_file.properties; step_render_event_mapping.properties.

In this case the screen mapping file will not be a simple one liner. Example portlet_screen_mapping_file.properties:
  ohdtraining-flowcontrol-multiportleta=multiportleta-screenid
  ohdtraining-flowcontrol-multiportletb=multiportletb-screenid
  ohdtraining-flowcontrol-multiportletc=multiportletc-screenid Global Configuration: For Global Configuration, the following is optional. Flows that are required to link together components from different WARs would be deployed to a shared app to the directory group/flow. The files that would be deployed to this directory are: flow-config.xml; portlet_screen_mapping_file.properties; step_render_event_mapping.properties. This is listed as optional as most components should be able to function with the default WAR or portlet level flows, but preferably one or more global flows are defined.

Wiring Steps

Creating WSDL: The following example shows how Gather Applicant Data (GAD) can be enabled to call the Validate Identity Portlet. In this example, GAD is the source portlet and Validate Identity is the target portlet.

Information is entered as shown in the screenshots in FIGS. 15-19 based on predetermined data (Data Type URI, Java Type, Action Parameter, Action Value, Location, Property Name, Property Caption, Action Caption) for the Wire Type 'Send'. In this example, the testportlet project only is used to create the WSDL. After creation the respective WSDL will be placed in the corresponding WARs.

Referring to FIG. 17, with the Action Parameter and Action Value there is a hidden field in the JSP from which the target portlet will be invoked. This invokes the property transfer to the property broker. The property broker will look for the above mentioned property (in this case ValidateIdenScreenId) in the request scope (since the Location is "Request attribute") of the source portlet. Later the value stored against this property will be transferred to the target portlet. In other words, the Action Parameter and Action Value (if found in the request scope) acts like a trigger to invoke the portlet wiring.

Figure 18:
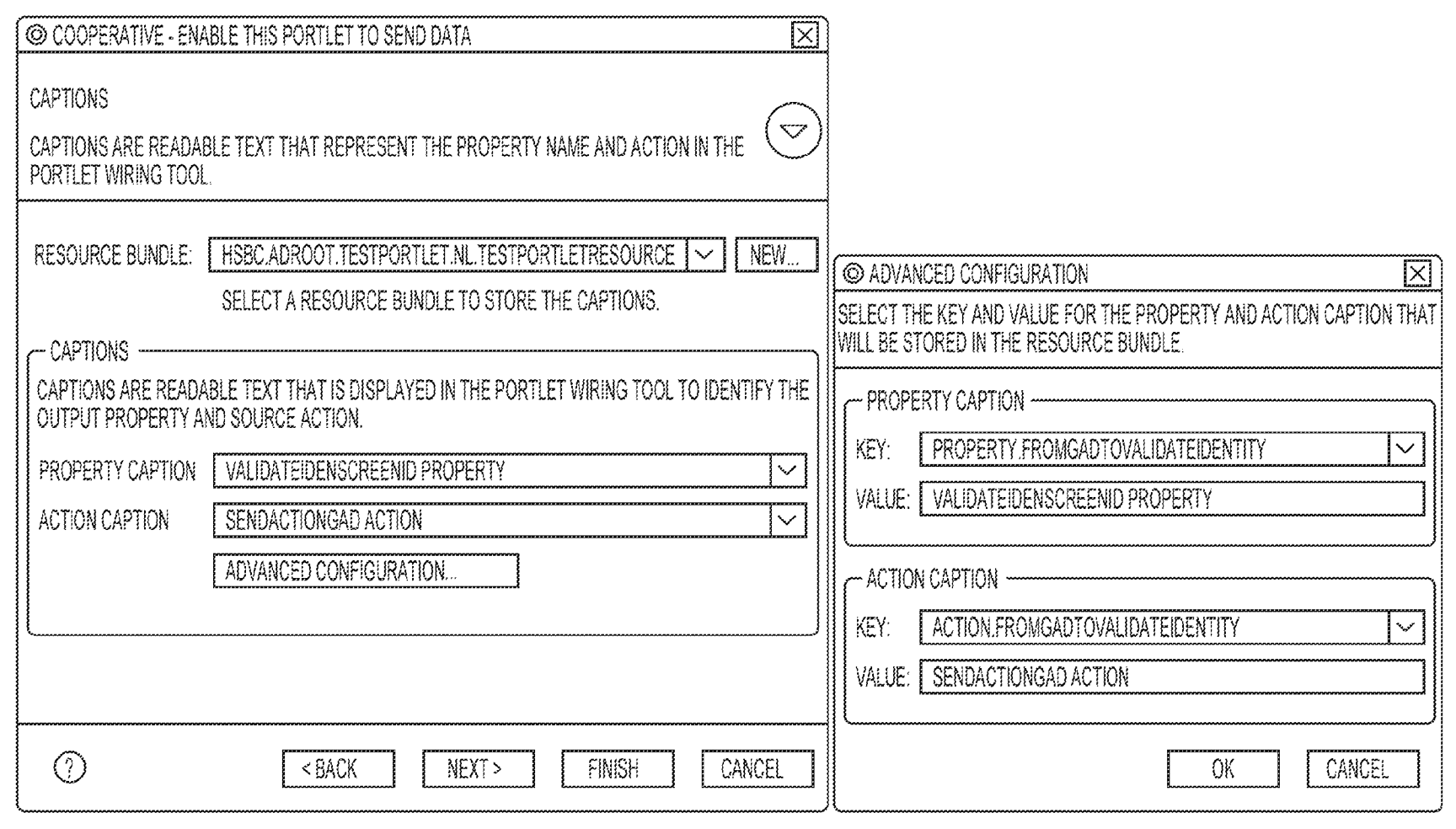

FIG. 18(*a*) shows a screenshot of a window in which captions may be specified. Click on Advanced Configuration to open the window shown in FIG. 18(*b*) and fill in values.

Figure 19:
Figure 20:
Figure 23:
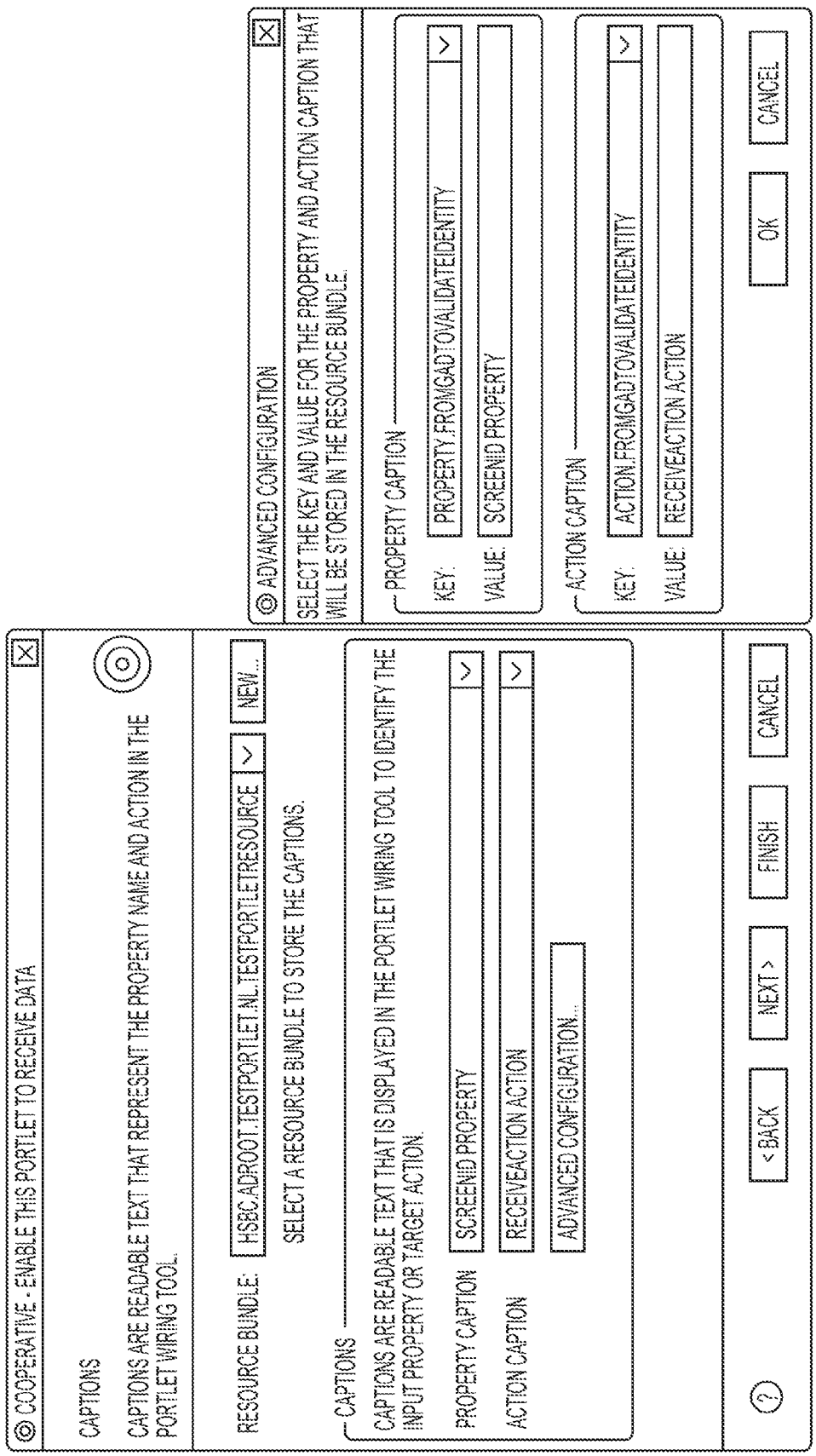

In FIG. 19, click on Finish to complete the creation of the WSDL.

FIGS. 20-24 illustrate screenshots for enabling Validate Identity to act as receiving portlet.

Referring to FIG. 21, while invoking the target portlet the property broker will place the property transferred from the source portlet against the above property name (in this case ScreenId) in the request scope of the target portlet. The Action Value is used to invoke the WiringNavigatorProcessor in the target portlet.

FIG. 23(a) shows a screenshot of a window in which captions may be specified. Click on Advanced Configuration to open the window shown in FIG. 23(b) and fill in values.

Figure 24:
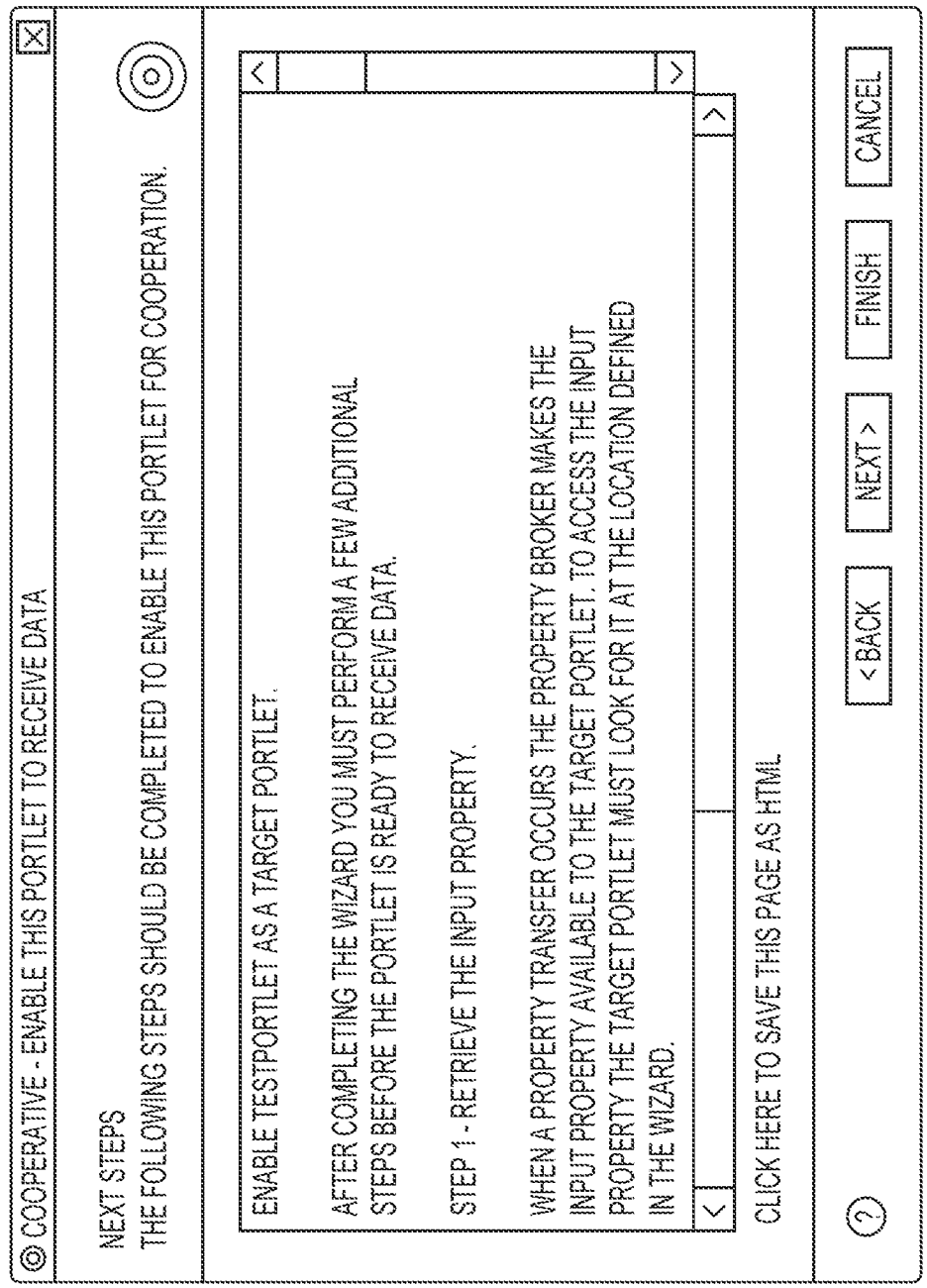

Click Finish in FIG. 24.

Figure 25:
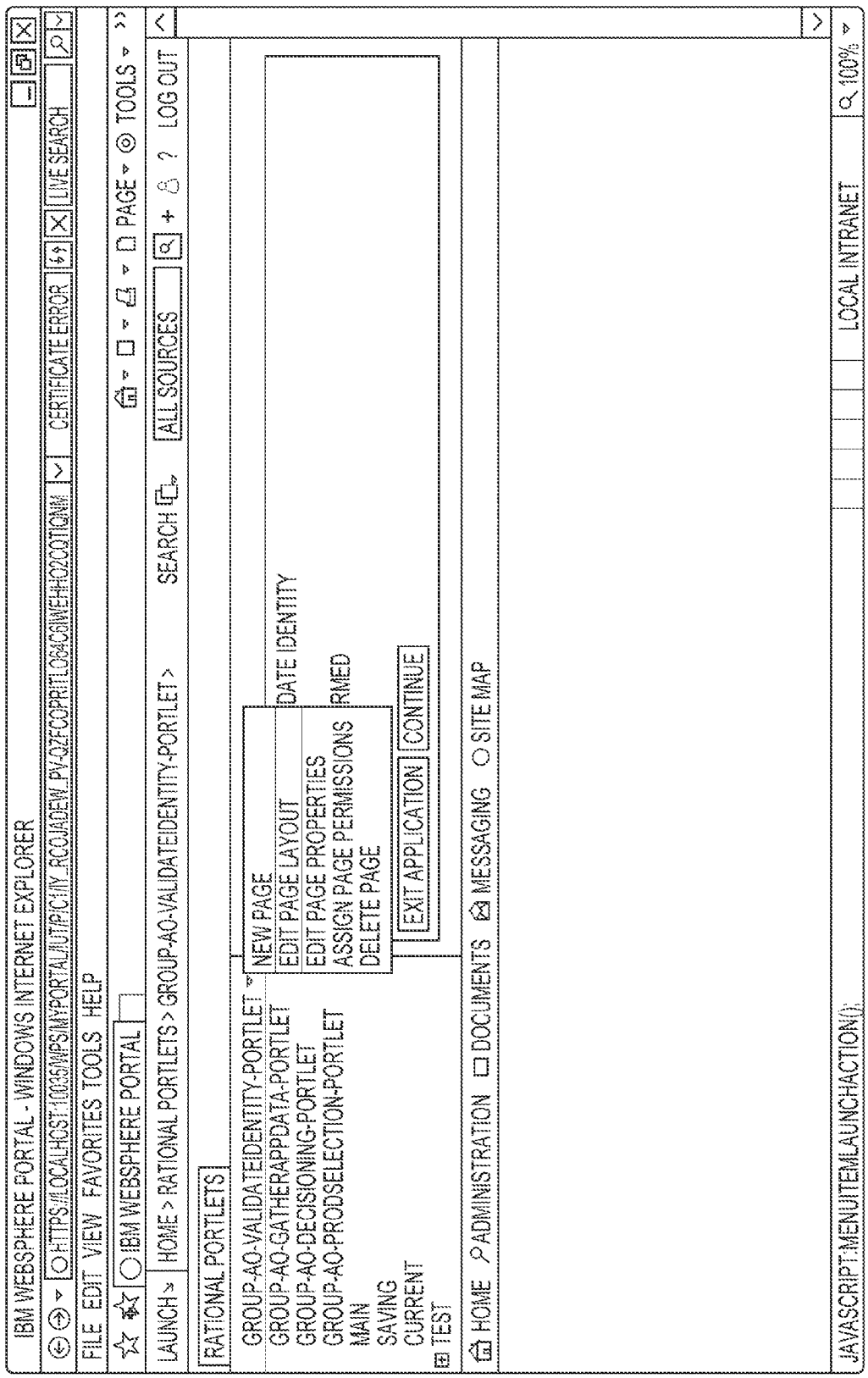
FIGS. 25-28 show screenshots for wiring portlets.

Wiring Both Portlets: To wire the portlets, go to Edit Page-Layout of the Target portlet, as shown in FIG. 25.

Figure 26:
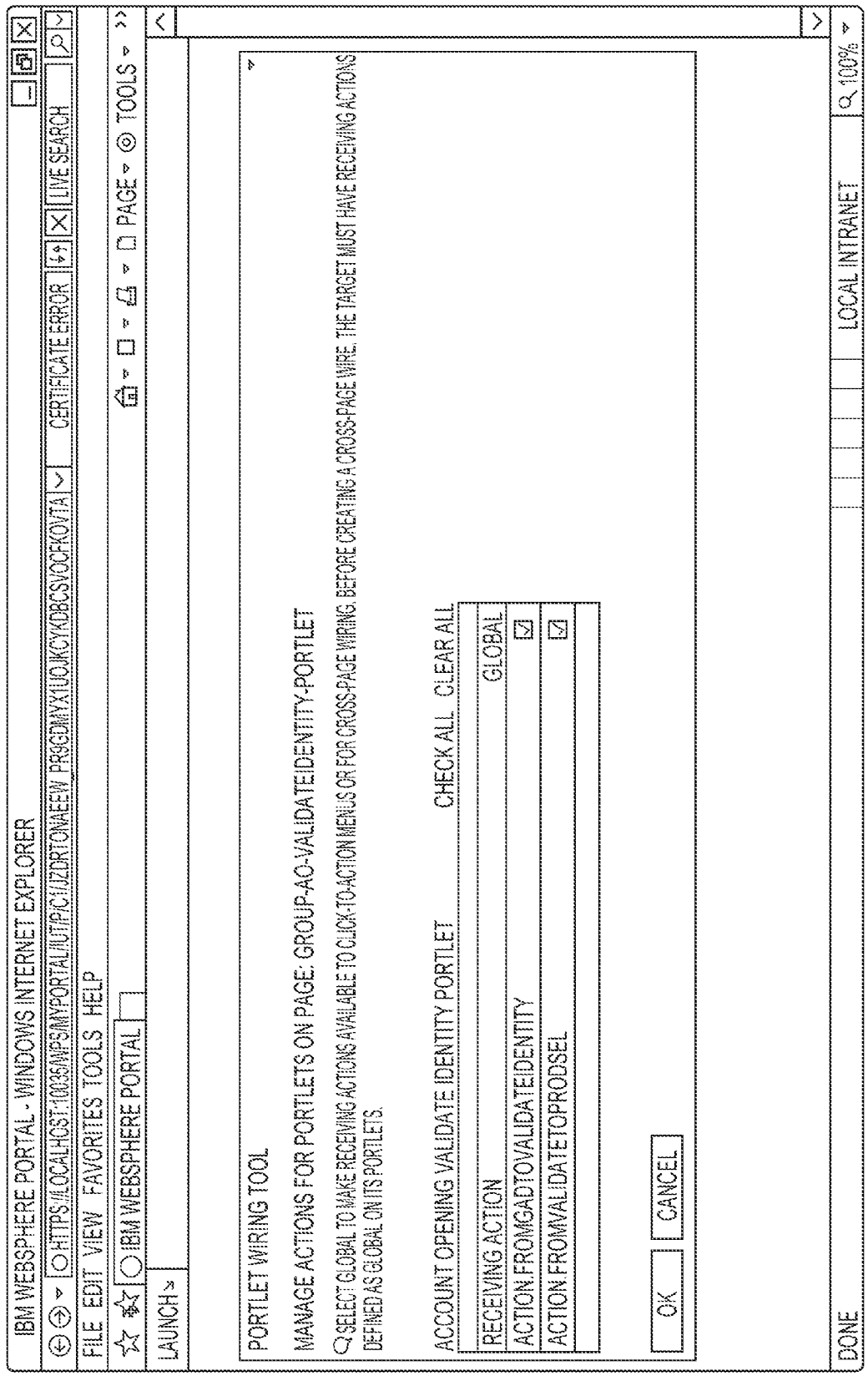

Go Wires→Manage Action and check all the checkboxes and click OK, as shown in FIG. 26.

Figure 27:
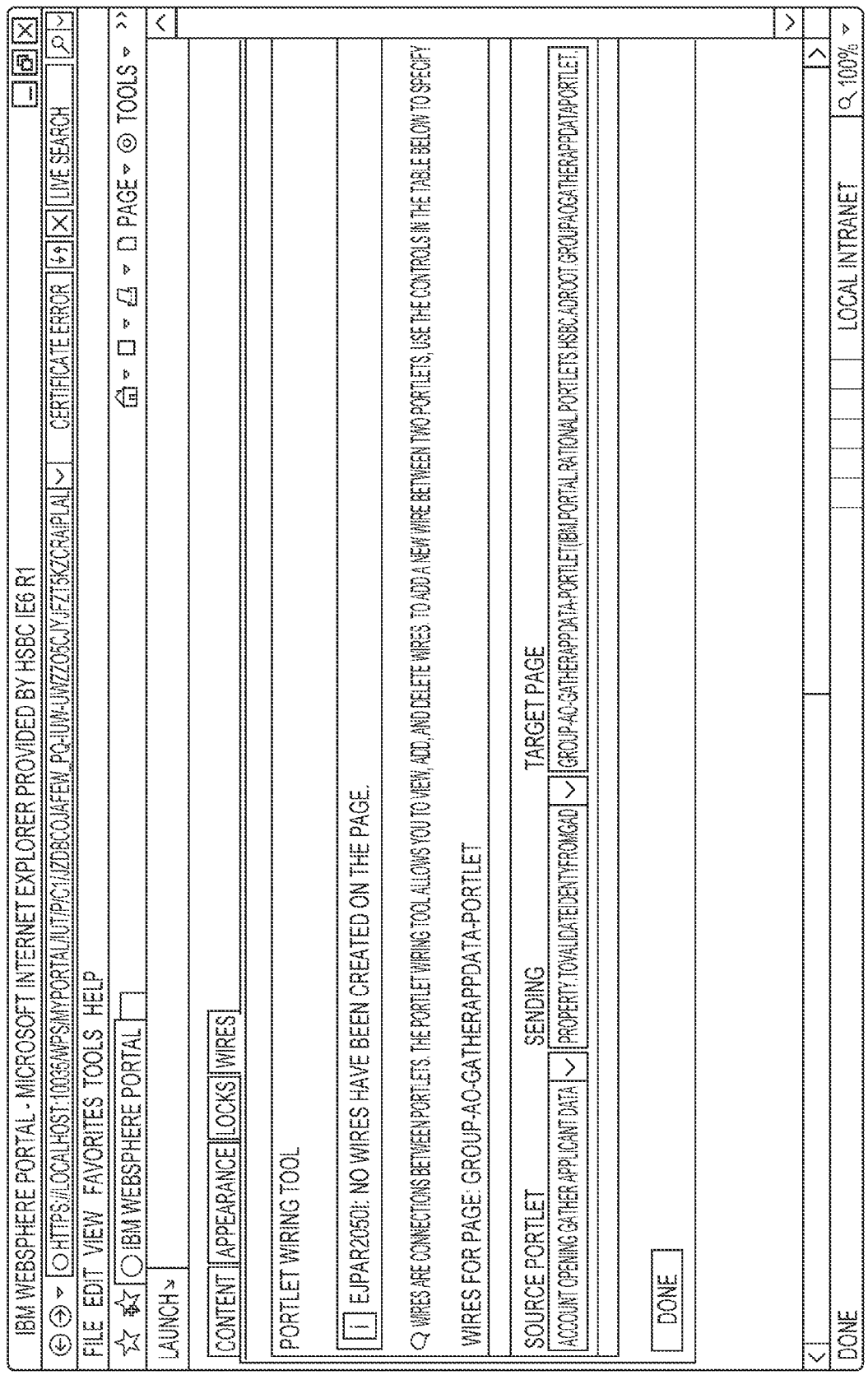
Figure 28:
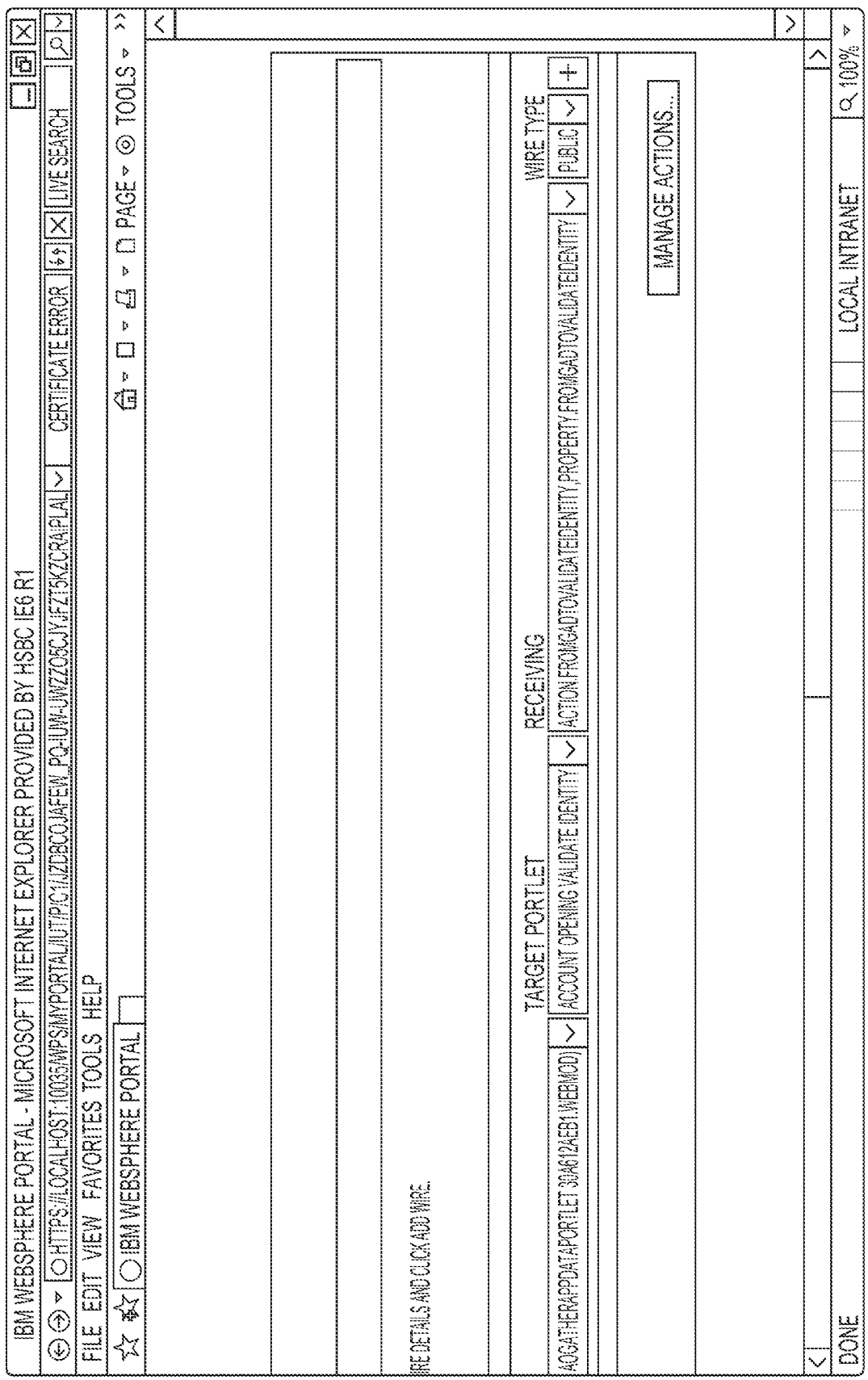

Click on wires and link the source and target portlets as shown in FIGS. 27-28. After linking click Done. The wire will be created in between the portlets.

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the instructions and/or operations performed may be referred to in terms, such as generating, determining, adding and/or comparing. The instructions and/or operations described herein which form part of the present invention are machine operations. Useful machines for performing the operation of the present invention include general purpose digital computers or similar devices that have been programmed to perform these specialized operations.

The present invention also relates to apparatus for performing these operations. This apparatus may be specially constructed for the required purpose or it may comprise a general purpose computer as selectively activated or reconfigured by a computer program stored in the computer. Various general purpose machines may be used with programs written in accordance with the teachings herein providing a specialized machine thereby, or it may prove more convenient to construct more specialized apparatus to perform the required method steps. The required structure for a variety of these machines will appear from the description given.

The system according to the invention may include a general purpose computer programmed in a particular manner, or a specially programmed special purpose computer. The user may interact with the system, for example, via a personal computer, wireless device, PDA, etc. Either of these may be implemented as a distributed computer system rather than a single computer. Similarly, the communications link may be a dedicated link, a modem over a POTS line, the Internet, an Intranet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, laptop/notebook, mini, mainframe and super computers, wireless smart devices, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the description above or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. An account opening computer system architecture, comprising:
 a flexible front end user interface (UI) implemented by said computer system and separating and decoupling a computer implemented user journey from a computer implemented process, said flexible front end user interface comprising:
- a plurality of portlets, each providing at least one functionality or a group of functionalities to be executed by said computer system and comprising a pluggable user interface software component managed in a web portal environment; and
- a component-based object-oriented flow configuration defining software instructions implemented by said computer system to perform the computer implemented front end user journey, providing navigation functionality across said plurality of portlets, and managing data for computer screen displays in UI object components, said component-based object-oriented flow configuration comprising:
  - a process object element defining a process of the component-based flow that renders at least part of a computer screen display; and
  - an action object element managing events that occur within a state of the process defined by said process object and driving screen navigations used in rendering the computer screen display for the front end user journey.

2. The account opening computer system of claim 1, wherein the flexible front end user interface provides a business user functionality to deploy champion and challenger user journeys and business processes, and determine an effective user journey responsive to predetermined criteria based on at least one of completion time and completion rate.

3. The account opening computer system of claim 1, wherein the flexible front end user interface captures processing data to detect where a user journey or a business process may be defective or ineffective responsive to predetermined criteria.

4. The account opening computer system of claim 1, wherein the flexible front end user interface provides a business user functionality to determine whether a user journey or a business process is defective responsive to predetermined criteria and, when the user journey or the business process is defective, to deploy a new user journey.

5. The account opening computer system of claim 1, wherein the account opening computer system manages the user journey and the business process substantially separately so that the user journey and the business process can be modified with substantially minimum impact to one another.

6. The account opening computer system of claim 1, wherein the plurality of portlets provide macro services that are configured, based one or more runtime parameters, to execute one or more micro services to fulfill a user request.

7. The account opening computer system of claim 6, wherein the business process can be enhanced by at least one of modifying the composition of the macro services and changing the behaviors of the micro services.

8. The account opening computer system of claim 6, wherein the flexible front end user interface provides configurable service invocation so that service calls can be linked to buttons in Java Server Pages (JSPs).

9. The account opening computer system of claim 1, wherein the computer implemented front end user journey is configurable so that the screen flow can be altered.

10. The account opening computer system of claim 1, wherein the flexible front end user interface provides functionality to save an application and finish a front end session, and to retrieve the application at a later time and resume from where the application was saved.

11. The account opening computer system of claim 1, wherein the UI object components comprise logical groups of data instead of data in individual fields.

12. The account opening computer system of claim 1, wherein each portlet is packaged in a web application archive (WAR).

13. The account opening computer system of claim 12, wherein the plurality of portlets are wired to each other.

14. The account opening computer system of claim 13, wherein the portlet wiring is defined in a Web Services Description Language (WSDL) file in the WAR.

15. The account opening computer system of claim 13, wherein the data for the computer screen displays are passed on the wire.

16. The account opening computer system of claim 1, wherein each portlet includes a flow navigator processor object determining the next step and, when the next step is defined in another portlet, establishing a request attribute to trigger a wire to the other portlet to execute the next step.

17. The account opening computer system of claim 16, wherein the flow navigator processor object uses a step-mapping configuration to determine if the next step is defined in a different portlet.

18. The account opening computer system of claim 16, wherein said triggering the wire comprises an initiating portlet sending a flow ID and a step ID as wired parameters to a target portlet.

19. The account opening computer system of claim 1, wherein the component-based object-oriented flow configuration further comprises an action-step object element defining an action handled by a branch class.

20. The account opening computer system of claim 19, wherein the branches are at least one of processor objects and service classes.

21. The account opening computer system of claim 1, wherein the action object element includes a branch-reference attribute indicating branch logic to be analyzed.

22. The account opening computer system of claim 1, wherein the component-based object-oriented flow configuration further comprises an option object element identifying a conditional output of a branch.

23. The account opening computer system of claim 1, in which a step ID and an action ID are mapped to an event defined in an ES configuration.

24. The account opening computer system of claim 1, wherein the flexible front end user interface comprises a Manage Instruction WAR including Capture Instruction, Instruction List, Instruction Details, Delete Instruction, and Edit Instruction portlets; a Currency Calculator WAR including a Currency Calculator portlet; and a Manage Linked Accounts WAR comprising Add Funding Source, Add Beneficiary, Delete Linked Account, Linked Account Details, Linked Account List, and Edit Linked Account portlets.

25. A method of opening an account for a user via a flexible front end user interface (UI) implemented by an account opening computer system and separating and decoupling a computer implemented user journey from a computer implemented process, comprising:
- providing a plurality of portlets, each providing at least one functionality or a group of functionalities to be executed by said computer system and comprising a pluggable user interface software component managed in a web portal environment; and
- providing a component-based object-oriented flow configuration defining software instructions implemented by said computer system to perform the computer implemented front end user journey, providing navigation functionality across said plurality of portlets, and managing data for computer screen displays in UI object components, said component-based object-oriented flow configuration comprising:
   a process object element defining a process of the component-based flow that renders at least part of a computer screen display; and
   an action object element managing events that occur within a state of the process defined by said process object and driving screen navigations used in rendering the computer screen display for the front end user journey,
   wherein said providing the plurality of portlets further comprises providing at least one of an Entry Portlet executing first electronic instructions to manage a request to start an account opening process, a Gather Application Data Portlet executing second electronic instructions to capture applicant data, a Decision Portlet executing third electronic instructions to display one or more products as approved/denied/pending, a Funding Portlet executing fourth electronic instructions to capture payments and fee instructions for the application and products, a Boarding Portlet executing fifth electronic instructions to display an application summary screen, and a Cross-Sell Portlet executing sixth electronic instructions to transmit information regarding additional products.

26. The computer implemented method of claim 25, further comprising:
   deploying champion and challenger user journeys and business processes; and
   determining an effective user journey responsive to predetermined criteria based on at least one of completion time and completion rate.

27. The computer implemented method of claim 25, further comprising:
   capturing processing data to detect where a user journey or a business process may be defective or ineffective responsive to predetermined criteria; and
   when the user journey or the business process is defective, deploying a new user journey.

28. The computer implemented method of claim 25, further comprising managing the user journey and the business process substantially separately so that the user journey and the business process can be modified with substantially minimum impact to one another.

29. The computer implemented method of claim 25, further comprising providing a visual editor generating said component-based object-oriented flow configuration.

30. The computer implemented method of claim 25, further comprising providing at least one portlet providing functionality to save an application and finish a front end session, and to retrieve the application at a later time and resume from where the application was saved.

31. The computer implemented method of claim 25, further comprising providing a flow navigator processor object determining the next step and, when the next step is defined in another portlet, establishing a request attribute to trigger a wire to the other portlet to execute the next step.

32. The computer implemented method of claim 25, further comprising providing said component-based object-oriented flow configuration comprising at least one of an action-step object element defining an action handled by a branch class, an action object element including a branch-reference attribute indicating branch logic to be analyzed, and an option object element identifying a conditional output of a branch.

33. A computer implemented method of providing a user with a flexible front end user interface (UI) that separates and decouples a computer implemented user journey from a computer implemented application process, comprising:
   providing a plurality of portlets, each providing at least one functionality or a group of functionalities to be executed by said computer system and comprising a pluggable user interface software component managed in a web portal environment;
   executing the computer implemented front end user journey using a component-based object-oriented flow configuration defining software instructions implemented by said computer system;
   providing navigation functionality across said plurality of portlets;
   managing data for computer screen displays in UI object components;
   defining a process of the component-based flow that renders at least part of a computer screen display; and
   managing events that occur within a state of the process and driving screen navigations used in rendering the computer screen display,
   wherein said providing the plurality of portlets further comprises providing at least one of an Entry Portlet executing first electronic instructions to manage a request to start an account opening process, a Gather Application Data Portlet executing second electronic instructions to capture applicant data, a Decision Portlet executing third electronic instructions to display one or more products as approved/denied/pending, a Funding Portlet executing fourth electronic instructions to capture payments and fee instructions for the application and products, a Boarding Portlet executing fifth electronic instructions to display an application summary screen, and a Cross-Sell Portlet executing sixth electronic instructions to transmit information regarding additional products.

34. The computer implemented method of claim 33, further comprising managing the user journey and the business process substantially separately so that the user journey and the business process can be modified with substantially minimum impact to one another.

35. The computer implemented method of claim 33, further comprising providing a visual editor generating said component-based object-oriented flow configuration.

36. The computer implemented method of claim 33, further comprising providing at least one portlet providing functionality to save an application and finish a front end session, and to retrieve the application at a later time and resume from where the application was saved.

37. The computer implemented method of claim 33, further comprising providing a plurality of core products portlets comprising at least one of: Retrieve Application Portlet, Non-Straight Through Processing Application Maintenance Menu Portlet, Account Opening (AO) Work Item Update Portlet, Communication History Portlet, AO Activity History Portlet, AO Queue Management Services Portlet, AO To-Do Items Portlet, AO Entity Data Portlet, AO Application Documentation Portlet, AO Communication Portlet, Integrated Customer Communications Manager Free Format Utility Portlet, and AO Entitlement Portlet.

38. The computer implemented method of claim 33, further comprising:
   providing a plurality of insurance portlets comprising a Quotes Portlet, an AS Entry Portlet, and a Policy Cancellation Portlet;

determining and presenting an insurance quote by the Quotes Portlet;

receiving from the user an acceptance of the insurance quote; and initiating the computer implemented front end user journey responsive to said acceptance.

39. The computer implemented method of claim 33, wherein said providing the plurality of portlets further comprises providing a Validate Identity portlet wired to the Gather Application Data portlet, the Gather Application Data portlet configured to send data to the Validate Identity portlet, and the Validate Identity portlet configured to receive data from the Gather Application Data portlet and execute seventh electronic instructions to validate the identity of the applicant.

40. The computer implemented method of claim 33, wherein said providing the plurality of portlets further comprises providing at least one of a Terms and Conditions (T&C) Portlet executing eighth electronic instructions to display terms and conditions for one or more approved products, and a Product Configuration Portlet executing ninth electronic instructions to display product configuration options for one or more products accepted by the applicant.

* * * * *